United States Patent
Clements

(10) Patent No.: US 10,275,098 B1
(45) Date of Patent: Apr. 30, 2019

(54) LASER MID-AIR HOLOGRAM TOUCH INPUT BUTTONS FOR A DEVICE

(71) Applicant: Sigmund Lindsay Clements, Montreal (CA)

(72) Inventor: Sigmund Lindsay Clements, Montreal (CA)

( * ) Notice: Subject to any disclaimer, the term of this patent is extended or adjusted under 35 U.S.C. 154(b) by 174 days.

(21) Appl. No.: 15/206,288

(22) Filed: Jul. 10, 2016

Related U.S. Application Data

(60) Provisional application No. 62/191,447, filed on Jul. 12, 2015, provisional application No. 62/297,804, filed on Feb. 20, 2016, provisional application No. 62/213,630, filed on Sep. 3, 2015.

(51) Int. Cl.
| | |
|---|---|
| *G09G 5/00* | (2006.01) |
| *G06F 3/042* | (2006.01) |
| *G03H 1/00* | (2006.01) |
| *G03H 1/26* | (2006.01) |

(52) U.S. Cl.
CPC ......... *G06F 3/0426* (2013.01); *G03H 1/0005* (2013.01); *G03H 1/26* (2013.01); *G03H 2001/0061* (2013.01)

(58) Field of Classification Search
CPC ......... G03H 2001/0061; G03H 1/0005; G03H 1/26; G06F 3/0426
See application file for complete search history.

(56) References Cited

U.S. PATENT DOCUMENTS

| | | | | | |
|---|---|---|---|---|---|
| 5,359,454 | A * | 10/1994 | Steenblik | ............... | B29C 39/026 359/463 |
| 6,822,770 | B1 * | 11/2004 | Takeyama | ................ | G02B 5/32 345/8 |
| 8,876,721 | B2 * | 11/2014 | Nakamura | ............... | A61B 8/42 600/459 |
| 2003/0035302 | A1 * | 2/2003 | Friedman | ................ | A47K 11/00 363/1 |
| 2005/0002074 | A1 * | 1/2005 | McPheters | ........... | G03H 1/0005 359/15 |
| 2007/0258118 | A1 * | 11/2007 | Toishi | ................... | G11B 7/0065 359/11 |
| 2008/0291156 | A1 * | 11/2008 | Dietz | .................... | H03K 17/941 345/156 |
| 2009/0109176 | A1 * | 4/2009 | Fein | ........................ | G06F 3/048 345/158 |

(Continued)

FOREIGN PATENT DOCUMENTS

JP          2002055630 A  *  2/2002

OTHER PUBLICATIONS

Yoichi Ochiai, Fairy Lights in Femtoseconds: Aerial and Volumetric Graphics Rendered by Focused Femtosecond Laser Combined with Computational Holographic Fields, University of Tsukuba, Japan, physicscentral.com, American Physical Society, Aug. 20, 2015.

*Primary Examiner* — Stacy Khoo

(57) ABSTRACT

Mid-air holograms are used, as touch input buttons, for a device. The buttons enable a user to touch input in mid-air, into devices, such as, smarts toilet's, or used as keyboard input buttons. Using the hologram input buttons, eliminates contacting possibly harmful bacteria, that may be on touch input buttons that have a surface. The holograms are created by lasers, are visible, and have haptic touch. The laser excites air molecules, causing them to illuminate.

20 Claims, 18 Drawing Sheets

(56) References Cited

U.S. PATENT DOCUMENTS

| | | | | |
|---|---|---|---|---|
| 2012/0170089 | A1* | 7/2012 | Kim | G06F 3/011 |
| | | | | 359/9 |
| 2013/0170006 | A1* | 7/2013 | Kurashige | G02B 5/0252 |
| | | | | 359/15 |
| 2014/0358002 | A1* | 12/2014 | Daoura | A61B 8/0883 |
| | | | | 600/443 |
| 2015/0103011 | A1* | 4/2015 | Large | G03H 1/0005 |
| | | | | 345/168 |
| 2015/0116454 | A1* | 4/2015 | Kim | G03H 1/0486 |
| | | | | 348/40 |

* cited by examiner

LASER MID-AIR HOLOGRAM TOUCH INPUT BUTTONS FOR A DEVICE

CROSS REFERENCE TO RELATED APPLICATIONS

This application claims the benefit of provisional patent applications Ser. No. 62/191,447 filled on Jul. 12, 2015, 62/213,630 filled on Sep. 3, 2015, and 62/297,804 filled on Feb. 20, 2016.

FEDERALLY SPONSORED RESEARCH

None

SEQUENCE LISTING

None

BACK GROUND FIELD OF THE EMBODIMENTS

Discussed embodiments relate to mid-air touch inputs displays. Specifically, to touch input holograms, created by a laser, and the touch input holograms connected to a device.

BACK GROUND OF THE EMBODIMENTS

Avoiding Bacteria

Many people don't like to touch input buttons, that have bacteria on them. Input buttons touched by multiple users, can accumulate germs on their surfaces. The germs can be transferred, back and forth between the buttons and the different users fingers. The more users touching the buttons, the more the chance of a user introducing harmful bacteria to the buttons.

Avoiding finger contact with a touch input button, reduces the contact, and transmission, with possibly harmful pathogens on the button. Reducing or eliminating bacterial transmission from the button to the user, reduces the possibility of the user becoming ill, from bacteria transmitted to the user.

A Remote Control to Operate a Device

There are different ways to operate a device, without touching buttons that have bacteria on them. Remote operation of a device is one way to avoid bacteria. Remote operation may include, the use of a remote control, to operate a device, such as, a television Avoiding Bacteria by Using a Smart Phone A smart phone can be used to operate a smart toilet. The phone frees a user, from touching smart toilet. input buttons, that have been touched by other users.

Avoiding Bacteria with a Mid-Air Hand Sensor

A sensor for detecting a hand in mid-air, can allow a user to operate a device. Infrared hand sensors are used, to operate devices in bathrooms. The sensors allow for operation a device, without touching a surface. Devices using the sensors include, sink water faucets, toilet flushers, and air flow hand dryers. In Hospitals motion sensing sensors are used to open doors, so users don't have to touch surfaces that may contain germs, and to stop users from leaving germs on input surfaces.

A problem with sensors, the user may wonder where the mid-air activation plane is located, since the user doesn't receive distance feedback before the switch activates. Trying to judge the distance to the activation plane, may allow the user's hand to touch a surface near the switch.

Touch Free Hologram Input Displays

Mid-air displays allow a user to avoid contacting bacteria, and viruses, by touch inputting in mid air. The operation of the display, evolves the user's the touching a mid-air hologram. The hologram is an input button. The touch of the hologram is detected as an input, by a sensor connected to a computer.

Water Droplet Displays

Some mid-air displays use holograms. One type of display uses laser light beamed onto fog, to create a mid-air hologram. A problem with fog holograms, is fog water droplets need to be produced, for the laser light to reflect off of to create the hologram. The fog display, lacks touch feedback, when touching a hologram, about their fingers location in mid-air.

Optical Illusion Displays

Mid-air holograms can also be created by using mirrored optical illusions. Ultrasonic transducers can be used to give the user mid-air touch feedback, which is associated to the hologram. The combined hologram and mid-air touch create, mid-air visual objects with mid-air touch. A Problem with optical illusions, is an accumulation of dust on mirrored surfaces, used to produce the optical illusion, may degrade the clarity of the optical illusion hologram.

Ineffective Ways to Avoid Bacteria

Some people try to wrap paper around their hand, before touching control panel buttons, in an effort to try to put an antibacterial barrier between their hand and the buttons. The paper barrier is ineffective, since bacteria can easily travel through paper. People may try to use a piece of clothing, such as, a part of a shirt sleeve as a barrier between the buttons, and the hand. The shirt sleeve may act as a barrier; thought bacteria can attach to the user's shirt sleeve.

Disposable rubber gloves may be effective, in using the buttons sanitarily, though it may be inconvenient to carry, and use gloves. Anti-bacterial swipes can be used to eliminate bacteria on buttons, though the discarded wipes produce waste.

Disadvantages of Mid-Air Touch Input Devices (a) Fog holograms need water droplets to produce a hologram.

(b) Optical illusion holographic displays may have a problem with dust accumulating on mirrors, used to create the optical illusion. The dust may diminish the clarity, of optical illusion holograms.

(c) Sensors like those used in sinks, don't give a user visual, and touch feedback, about the location of a mid-air input area. The user needs to visually see the surface, that their trying to avoid. The user needs to stop the forward motion of their finger, toward the surface. Contact with the surface, increases the chance of transferring bacteria between the surface and the user's finger. Sensors lack a plurality of input buttons, due to the inability to identify, the different buttons functions.

(d) Remote controls need to be carrier by a user. If the control is used by many users, users may transfer each others bacteria.

SUMMARY

This Summary is provided to introduce a selection of concepts in a simplified form that are further described below in the detailed description. This Summary is not intended to identify key features or essential features of the claimed subject matter, nor is it intended to be used to limit the scope of the claimed subject matter.

The above deficiencies, and other problems associated with interacting with touch screen displays, are reduced or eliminated by laser input buttons. The claimed subject matter, is not limited to implementations, that solve any or all of the noted disadvantages.

A Lasers Creating Floating Holograms

A femtosecond laser device creates a floating hologram, which also has mid-air haptic touch. A laser device, such as one, made by the Digital Nature Group's creates floating holograms. The laser device has a computer, and a camera. The computer is connected to a device.

A user can use the touch the floating holograms, to operate the device. Touching of the hologram, by the user's finger, is detected as an input. The input can be used to effect the operation of a device, such as, an on off switch, or an elevator.

The laser creates a plasma by exciting oxygen and nitrogen molecules in the air. The laser creates a fluorescence plasma luminescence. The plasma is viewable by the user. The holographic display is capable of producing images in mid-air, without the need of screen or external refraction media. The laser plasma display, is able to depict very bright, and visible objects.

The excitation of the air molecules, by the laser, can also be felt by touching the plasma. The plasma produces mid-air haptic touch.

The plasma creates a sound. The sound is in an acceptable volume range of 20-55 decibel. The sound can allow the user, to audibly locate the hologram.

A Camera Detects Touch of a Hologram

The camera is positioned to view the user's finger touching the hologram. A software in the computer, detects from the images received from the camera, the user's finger touching the hologram.

The hologram is associated to an operation of a device. The user's input of the hologram activates, the function associated to the operation of the device. The computer sends the activated function, to the device. The device use's the received operating function, to operate the device.

User Input Detection Area

Different input areas can be created at the hologram, or around the hologram. The user input detection area, can be near the hologram. The user input can be set, to be detected, when the finger is near the hologram, without the finger contacting the hologram. The input area can be on the other side of the hologram, with the finger contacting the hologram, before contacting the input area.

Bacterial Free Devices

Many lasers can be grouped together. Each laser can show, a different hologram. Each hologram can be an input button. A different device function, can be associated to each hologram. The different holograms can be grouped, to create input display control panels, such as, a smart toilet's input buttons, or a vending machine's input numbers. Each hologram can be a different letter of an alphabet, to create a keyboard.

The computer can be connected to devices, such as, a public information displays. An example of the operation of holograms, used is the public information display. The user sees input holograms, for changing a view of the public information display. The user touches one of the holograms, which changes the view of the display. The camera and computer detect, the touch of the hologram. The computer actives a software, associated to the touched hologram. The activated software, is sent to the display. The display uses the received software, to effect the operation of the display. The display changes the view, shown on the display.

Visual and Touch Feedback Helps Avoids Contact with Bacteria

The haptic feedback from the hologram, allows a user to avoid contacting a surface, with their finger, while mid-air inputting a hologram. The feedback allows the user to stop the forward motion of their finger toward, a surface near the hologram. Stopping the finger from contacting the surfare, allows the user to avoid contacting bacteria on the surface.

Avoiding finger contact with bacteria on the physical panel, eliminates the transference of possible harmful bacteria from the surface to the finger. Reducing exposure to bacteria, increase a user's chance to avoid being contaminated by bacteria.

Visual feedback of contact with a hologram, may include, a changing of shape, changing design, increase in brightness, change in florescence, and or a changing of color of the hologram. The changes inform the user, that the hologram button has been touched, and activated. The changes can also inform the user that their finger is close to the button, and or that the user's finger is perpendicular, and on the path to activate the button.

The holograms can be visually attractive. The holograms can change to create visually pleasing colors, shapes, and movement.

There are many advantages to users, who receive mid-air finger location information, while using a mid-air panel with holographic buttons, and mid-air haptic touch to activate icons arranged as an input display displayed.

Advantages

In the preceding description, a number of advantages of the embodiments of touch holograms become evident:

(a) Holographic input control panels, can be operated bacterially free. Operating free of bacteria, is useful for devices that may have bacteria, on their input surfaces. Panel buttons which can be operated free of bacteria, include, smart toilet panel buttons, elevator input buttons, and public touch input buttons, etc.

(b) Feeling haptic touch when they touch the hologram, allows the user to be aware they have contacted the hologram. Being informed of their contact with the hologram, gives the user information about their finger's location in mid-air, which allows the user to avoid touching a surface with bacteria on it. The user is able to stop, the forward motion of their finger toward the surface.

(c) The user is aware they have contacted the hologram, by visual feedback, such as, a brightening of the hologram, or a changing shape of the hologram, (d) The hollo reduces the mental energy needed to operate a mid-air display, by receiving information, about their finger's location, in relation to mid-air touch buttons.

(e) The holograms designs, can easily be changed by the computer. The computer can be connected, to different devices. The ability to change the design of the holograms, allows the holograms to be changed, and used for the different devices, and be specific for each device.

(f) The hologram can be a recreation of an object, viewed by a camera. A user can view, and touch the holographic shape of the object. For example, a hologram can be created of a bird, from a view of a bird, (g) With two or more connected laser devices, people can view, and touch each other holograms.

(h) The holograms are visually attractive.

Using mid-air holographs with mid-air touch feedback, to mid-air input, into a midair touch input panel, brings the future, of sanitary, and safe mid-air touch input to the present now.

BRIEF DESCRIPTION OF THE DRAWINGS—FIGURES

Figure 1:
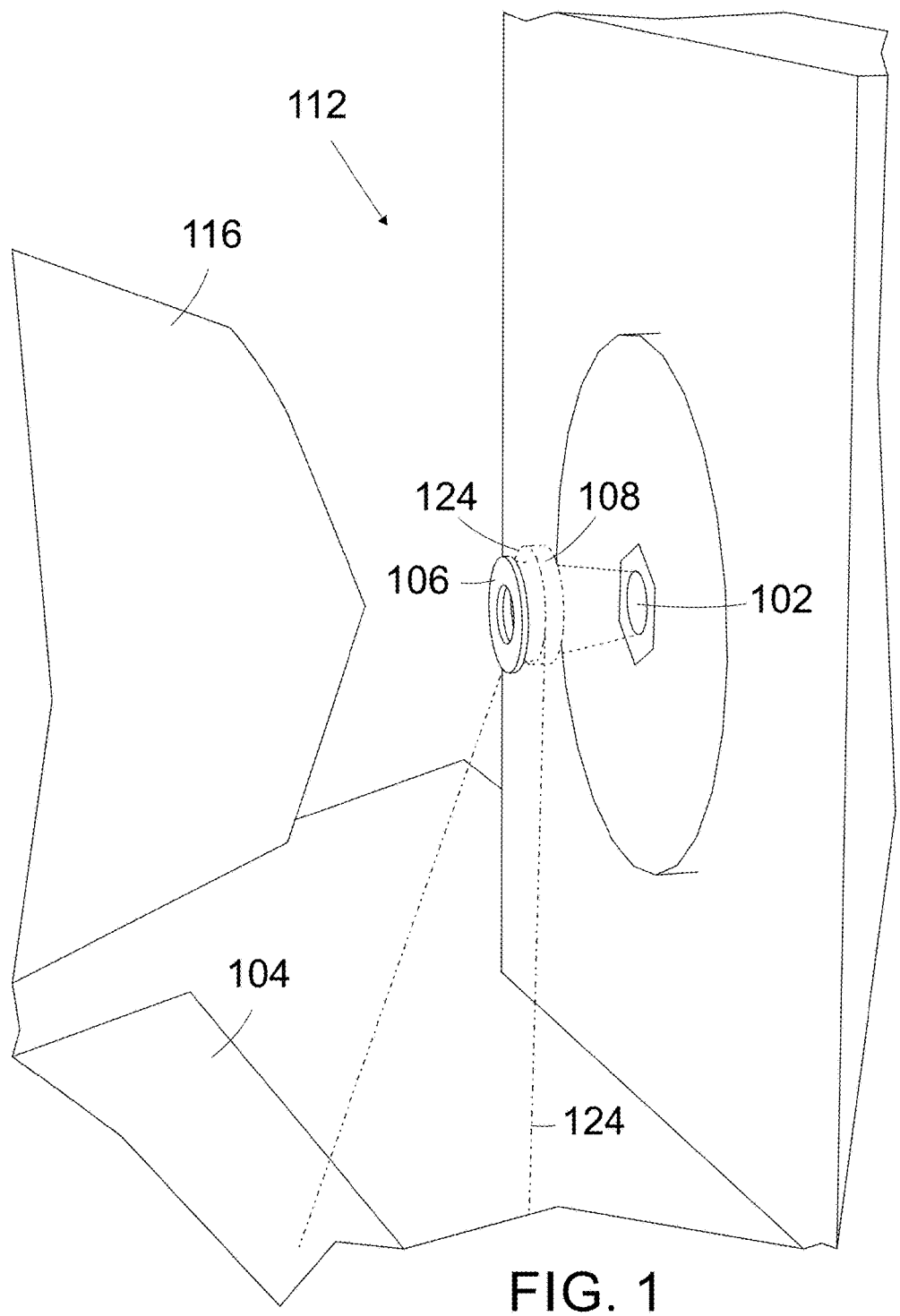
FIG. 1 is a perspective view of a mid-air hologram, arranged as a touch input button for a light on off switch.

REFERENCE NUMBERS 102 femtosecond laser devices
104 hand gesture recognition camera
106 mid-air hologram and mid-air haptic touch area
108 mid-air input area
112 light switch
116 finger
122 laser beam
124 camera viewing area
202 femtosecond laser devices
204 hand gesture recognition camera
206 mid-air hologram and mid-air haptic touch area
216 finger
228 on
230 off
232 speaker
302 femtosecond laser devices
304 hand gesture recognition camera
306 mid-air hologram and mid-air haptic touch area
312 keyboard
314 display
322 laser beam
324 ultrasonic mid-air finger locators
402 small femtosecond laser devices
404 hand gesture recognition camera
406 mid-air hologram and mid-air haptic touch area
408 mid-air input area
410 big femtosecond laser device
412 radio and other devices control panel interface
414 medium femtosecond laser devices
416 station indicator
418 change to another device switch
426 dashboard
428 radio station change station increase or decrease holograms
436 sound volume indicator hologram
438 sound volume increase or decrease holograms
502 small femtosecond laser devices
504 gesture recognition camera
506 first mid-air hologram and mid-air haptic touch area
507 second mid-air hologram and mid-air haptic touch area
510 big femtosecond laser device
514 medium femtosecond laser devices
516 first user
517 second user
518 first computer with display
519 second computer with display
520 second laser group
522 laser beam
524 camera viewing area
526 WIFI
602 femtosecond laser
604 hand gesture recognition camera
606 mid-air hologram and mid-air haptic touch area
608 mid-air input area
610 hologram shape or design change
612 elevator
614 user
616 finger
618 display
620 hologram elevator control panel
622 laser beam
624 camera viewing area
626 diagonal lines
702 femtosecond lasers device
704 first gesture recognition cameras
706 first mid-air hologram and mid-air haptic touch area
710 second gesture recognition cameras
716 first user
718 second another user
720 first computer with display
722 second computer with display
726 a keyboard
728 a paper box
802 femtosecond lasers device
804 3D camera
806 mid-air hologram and mid-air haptic touch area
808 user
810 outside computer
812 inside computer and display
814 tower
816 bird
818 holographic tower
820 holographic bird
822 cursor
824 displayed object
826 displayed bird
902 femtosecond laser devices,
904 hand gesture recognition camera,
906 mid-air hologram and mid-air haptic touch area
910 big femtosecond laser device 912 toilet control panel,
916 finger,
922 laser beam,
924 camera viewing area,
926 toilet,
928 increase hologram,
930 decrease hologram,
932 water pressure
934 indicator lines,
935 temperature indicator hologram,
936 increase hologram,
938 decrease hologram,
940 pressure scale
942 pressure indicator hologram,
944 indicator lines
1402 femtosecond lasers device
1404 3D camera
1406 mid-air hologram and mid-air haptic touch area
1408 user
1412 laser beam
1414 store payment machine
1416 input icon
1418 credit card reader
1420 display
1702 lasers
1704 user
1706 hologram at distance from the laser
1708 hologram extending from outward from the laser
1712 the hologram
1714 gesture recognition sensors
1802 lasers
1804 user
1808 3D hologram
1812 2D hologram
1814 gesture recognition sensors Further features of the embodiments, its nature and various advantages will be more apparent from the accompanying drawings, and the following detailed description of the embodiments.

DETAILED DESCRIPTION FIRST EMBODIMENT

A On Off Light Switch with Touch Input Holograms
Description
Holograms Created by a Femtosecond Laser A femtosecond laser device 102, is used to create a holographic on off light switch 112, which floats in the air, located in mid-air, and is touch activated. The laser creates aerial plasma images, a mid-air hologram, volumetric display's, three dimensional 3D display's, aerial and volumetric graphics, or aerial holographic button's 108.

Mid-air haptic touch 108 is also created by the laser, and occupies the same space as the hologram, as shown in FIG. 1. The two lasers are positioned to project holograms 4 cm from the lasers, and are located 3 cm vertically from each other.

The femtosecond laser is connected to a computer. The femtosecond laser is made by the Digital Nature Group. The Digital Nature Group use lasers, mirrors and cameras to create three-dimensional, interactive holograms 108. The holograms are comprised of tiny points of light called voxels.

Using femtosecond lasers, the device can make holograms that are safe to touch. A femtosecond is a quadrillionth of a second, and the lasers transmit bursts that last 30 to 270 femtoseconds The images are three-dimensional, with resolutions up to 200,000 dots per second. The voxels are light emitted by plasma, that's created when the laser's focused energy ionizes the air.

The lasers fire at such a high speed, they're able to react in real-time. The lasers can create usable holograms, such as, checkboxes, and hearts that change their look when touched. The user's touch of the voxels generates a shockwave, which the user feels as an pulse. The voxels respond in real-time to these touches.

To create the hologram, the femtosecond laser fires through a spatial light modulator, which continues the beam through a series of lenses, a mirror and a Galvano scanner, which positions a mirror to precisely direct the laser beams. A camera underneath the hologram captures the user's interaction, allowing the dots to respond to being touched.

A Camera for Detecting a User's Touch of the Hologram

A camera with a view of the hologram, captures and records the user's touch interactions with the hologram. The camera is positioned to view a user's finger's, contact with the hologram. The camera detects the user's finger, touching the hologram.

A second mid-air hand gesture recognition sensor 104, mid-air finger location detector, is connected to the computer. The second gesture sensor acts as a back up to the laser device's mid-air sensor. The second sensor also views a larger mid-air area. The second gesture recognition sensor can be a sensor, and or camera. The camera is a realsense gesture recognition camera, made by the Intel Company.

An Input Associated to a User's Touch of a Hologram

When the computer receives input, that the user has touch inputted, an on or off command, the computer signals the light switch, to activate the corresponding on or off switch function. The on input command turns the light on, and the off input command turns the light off.

Software

The computer is connected, to the on off light switch. The computer is programmed with software, to instruct the on off switch to either be on or off. The instructions can turn the light on or off. The computer is programmed with a software, for operating the computer. A device, which is the light switch, is connected to the computer. The computer is programmed with realsense camera software.

Different Shaped Holograms

The mid-air hologram, and a mid-air haptic touch area 108 are located in the same mid-air location, and are created by the laser. The hologram is shaped like a circle, 0.3 centimeter cm in width. The holograms shape can change when the laser detects a finger contacting the hologram. The holograms largest viewing area, is positioned flat perpendicularly, 5 cm from a wall. The laser is in the wall. The laser projects laser beams 122 outwardly from the wall. The holograms can be different shapes, colors, letters, and numbers, etc. The holograms are volumetric, they have volume, depth, width and height.

Various Devices can have Holographic Input Buttons

More than one lasers, can be used to the create the mid-air input display. Other devices that could use the display, include, an elevator control panel, a store checkout payment station, a gas pump, a space station display, a medical environment holographic keyboard, a flammable environment input display, an anti-static environment input display, an ATM machine, a smart phone, a car dashboard control panel, a driverless car dashboard control panel, a smart toilet, and a tablet computer, etc.

The laser devices may also be used with many different devices, such as, a toilet remote control display, a vending machine display, a store credit card or debit payment machine display, an outer space station control panel, a bank ATM display surface, a medical display surface, and an elevator control panel, etc.

Alternatives to the Camera

Other mid-air gesture recognition cameras, and sensors could be used, such as, a Leap sensor made by the Leap Company, or a cambord Pico camera.

The mid-air recognition sensor 104 could also be infrared sensor, or a laser beam who detects the finger when the laser's beam is broken by the finger. Other three dimensional sensors 3D and cameras could be used, such as, an Elliptic labs ultrasonic mid-air gesture recognition sensors, an Intel Perceptual Computing Camera, a Primesense camera, a Kinect technology camera sensor, a Kinect sensor, a Haptix gesture recognition chip, a Flutter gesture recognition system, an elliptic labs ultrasonic sensor, a nano camera using light reflection from the MIT school, to determine the location of a user's finger, and a Chirp, made by Chirp Microsystems Company, which uses ultra-sonic waves for finger detection, etc.

Safety of the Lasers

The laser is safe for contact with skin. Class 4 lasers are use to create the holograms. For safety a sign saying, 'don't put eyes in direct contact with the laser', is displayed within view of users, to avoid possible damage to the eyes. The laser beams can also be angled so that the beams aren't perpendicular, or directed directly into the users' eyes. Protective glasses can also be worn, to eliminate any possible safety hazard to the eyes.

Power Supply

A motor controller (not shown) is connected to an alternating current power supply. The current is supplied by a building power connection. The motor controller supplies power to the touch free devices components, such as, the camera, the laser device, etc. The computer communicates with the components. The display devices components, are connected to the motor controller and the computer. The components include the femtosecond laser, the computer, and the light.

For brevity when referring to the devices connection to the computer, it is implied that the devices and the computer communicate with each other. The devices can also connect to the motor controller, with electrical wire which supplies electrical power to the devices.

Avoiding Touching Bacteria on Input Surfaces

The mid-air display allows users to input into the display without having to touch an input surface. Not having to touch the surface, eliminates the possibility of a transference of bacteria, or viruses to the user's fingers, from bacteria, or viruses on the touch surface.

A On Off Light Switch with Touch Input Holograms Operation

Visual Feedback

The user's finger 116 contacts the circle mid-air hologram 106, as illustrated in FIG. 1. The shape of the circle visually changes to a star (not shown). The haptic feel of the hologram, may be comparable to a feeling similar to touching sand paper, or feeling mild static electrical discharges. The feel 106 informs the user that they have contacted the hologram. The change of shape of the hologram, gives visual feedback, that their finger has contacted the hologram.

Turning the Light On or Off

The camera and computer visually 124 detects the user's finger's contact, with the predetermined invisible mid-air input area 124. The camera sends the visual location of the finger, in mid-air to the computer. The computer interprets the finger's contact with the area, as a mid-air touch input. The input changes the switch from its present position, to the other position, for example, if the switch is in the off position, the touch input of the finger, will turn the switch to the on position, and vice versa.

The feedback information, that the hologram has been contacted, informs the user that the contact, is interpreted as an input, into the light on off switch. When the finger is removed from the input area 108 the computer, interprets a next finger contact with the area, as a next input.

Finding the On Off Switch

The laser 102 can remain continually on, continually creating the hologram, or can turn off when not in use. The switch 112 can also turn on from an off state, and create the hologram, when the user's hand is detected within 30 centimeters of the switch, by the camera. The laser can turn off after 20 second, when use of the switch isn't detected.

A sign near the switch can describe the operation of the switch, as an, 'on off switch', and give instructions on how to use the switch. The instructions could say, place hand within 30 cm to activate the hologram, then touch the hologram to turn the light either on or off.

The holograms can be programmed to change shape, move, when being touched. Without being touched, the holograms can change shape, and move.

Alternate Embodiments

Holographic Elevator Control Panel Description

Figure 12:
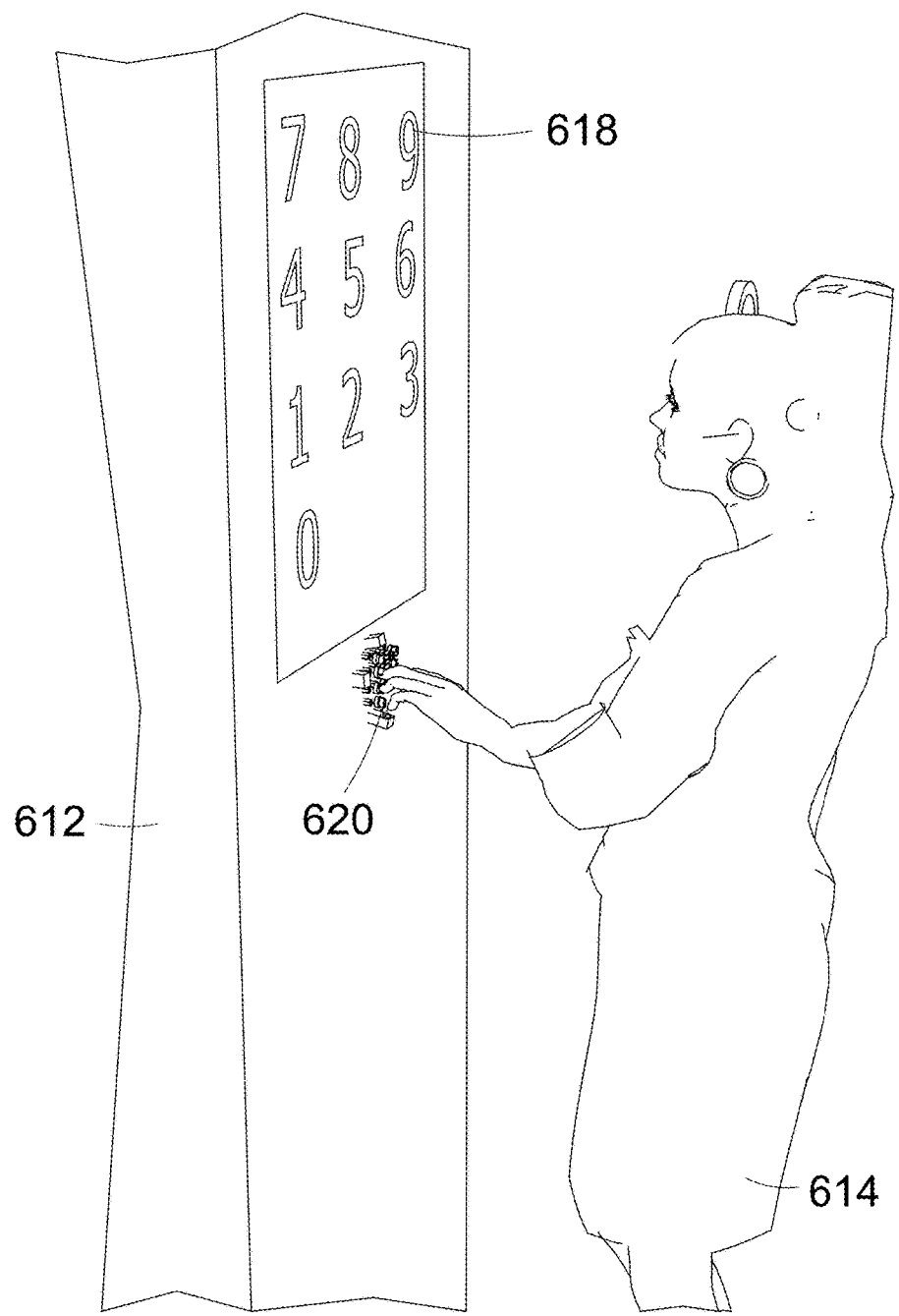
FIGS. 12 and 13 shows a perspective of view a mid-air touch input elevator control panel.
Figure 13:
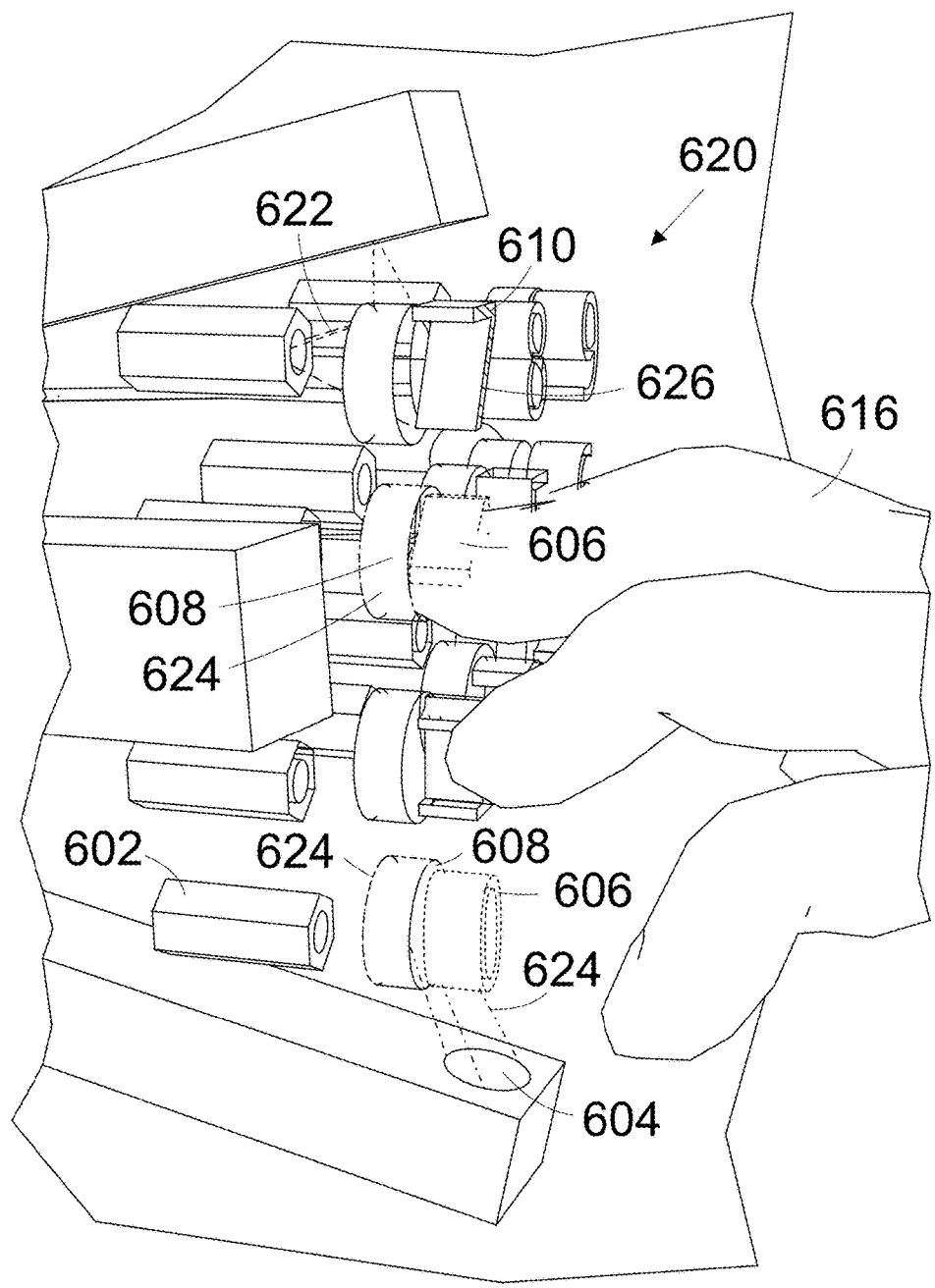

Femtosecond laser devices are attached to an elevator, and are used to create a control panel, for an elevator. The lasers are positioned, to each project a hologram, as illustrated in FIGS. 12 and 13. The Lasers 602 are positioned, to create the control panel 620. The holograms are 4 cm from the lasers. Lasers beams 622 are spaced 1 cm horizontally from each other.

The laser control panel locate is inside the elevator 612, within touch of a user. Individual holograms 606 visually show, an input for the elevator, such as, 4 floor, close door, etc.

The lasers 602 are connected to a computer (not shown). The computer is connected to the elevator. Four realsense mid-air hand gesture recognition cameras 604, are located to sense, a user's 614 finger's 616 contact within a predetermined mid-air viewing areas 624. The predetermined input areas 608 are located 0.2 cm below the area's, which are occupied by the holograms. A display 618 is connected to the computer.

Storage

These computer program instructions may also be stored in a computer-readable medium that can direct a computer or other programmable data processing apparatus, to function in a particular manner, such that the instructions stored in the computer-readable medium produce a function of a device, including instructions which implement the function act specified in the flowchart and or block diagram block or blocks.

The computer program instructions may also be loaded onto a computer or other programmable data processing apparatus, to cause a series of operational steps to be performed on the computer, or other programmable apparatus to produce a computer implemented process, such that, the instructions which execute on the computer, or other programmable apparatus provide processes, for implementing the functions or acts specified, in the flowchart and or block diagram block or blocks.

The computer may further include on-board data storage, such as memory coupled to the processor. The memory may store software that can be accessed and executed by the processor, for example. The host may be any type of computing device or transmitter including a laptop computer, a mobile telephone, etc., that is configured to transmit data to the device. The host and the device may contain hardware to enable the communication link, such as processors, transmitters, receivers, antennas, etc.

The computer may connect to the femtosecond laser, locally, over a network, or at a distant location over the internet. The laser may be connected to a quantum cloud computer, to enable quantum cloud computing.

Communication Links

In the communication link is illustrated as a wired connection, however wireless connections may also be used. For example, the communication link may be a wired link via a serial bus such as USB, or a parallel bus. A wired connection may be a proprietary connection as well. The communication link may also be a wireless connection, such as Bluetooth, IEEE 802.11 or other wireless based communication links. In another example, the system includes an access point through which the device may communicate with the internet. In this example, the device may not require connectivity to the host.

The access point may take various forms. For example, if the device connects using 802.11 or via an Ethernet connection, the access point may take the form of a wireless access point (WAP) or wireless router. As another example, if the device connects using a cellular air-interface protocol, such as a CDMA or GSM protocol, the access point may be a base station in a cellular network that provides Internet connectivity via the cellular network.

As such, the device may include a wired or wireless network interface through which the device can connect to the access point. As an example, the device may be configured to connect to access point using one or more protocols such as 802.11, 802.16 (WiMAX), LTE, GSM, GPRS, CDMA, EV-DO, and/or HSPDA, among others.

Furthermore, the device may be configured to connect to access point using multiple wired and/or wireless protocols, such as "3G" or "4G" data connectivity using a cellular communication protocol (e.g., CDMA, GSM, or WiMAX, as well as for "Wi-Fi" connectivity using 802.11). Other examples are also possible. Alternatively, the host may also include connectivity to the internet, and thus, the device may access the internet through the host.

Programming

In addition, for the method and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example.

The computer readable media may also be any other volatile or non-volatile storage systems. The computer readable medium may be considered a computer readable storage medium, for example, or a tangible storage device.

An Intel perceptual computing software developer's kit could be used to build applications for the smart toilet applications. The Microsoft Software Developers Kit can be used build elevator function applications.

Various programming languages can be used to program the computer 106 such as C++, C#, and Microsoft Visual Studio Ultimate, Microsoft Visual Programming Language, Microsoft NET 4.0 XNA 4.0, Silverlight 4.0, and Visual Basic.NET.

The computer may be programmed using, a Microsoft windows commercial software development kit. The computer may run a Linux operating system, or an Android operating system, or an apple operating system.

Computer program code for carrying out operations of the object detection and selection mechanism may be written in any combination of one or more programming languages, including an object oriented programming language such as Java, Smalltalk, C++ or the like and conventional procedural programming languages, such as the "C" programming language or similar programming languages.

The program code may execute entirely on the computer, partly on the computer, as a stand-alone software package, partly on the computer and partly on a remote computer or entirely on the remote computer or server. In the latter scenario, the remote computer may be connected to the computer through any type of network, including a local area network (LAN) or a wide area network (WAN), or the connection may be made to an external computer (for example, through the Internet using an Internet Service Provider).

The object detection and selection mechanism is described below with reference to flowchart illustrations and or block diagrams of methods, apparatus (systems) and computer program products according to implementations thereof. It will be understood that each block of the flowchart illustrations, FIG. 15, and or block diagrams, and combinations of blocks in the flowchart illustrations and/or block diagrams, can be implemented or supported by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Operation Flowchart

Figure 15:
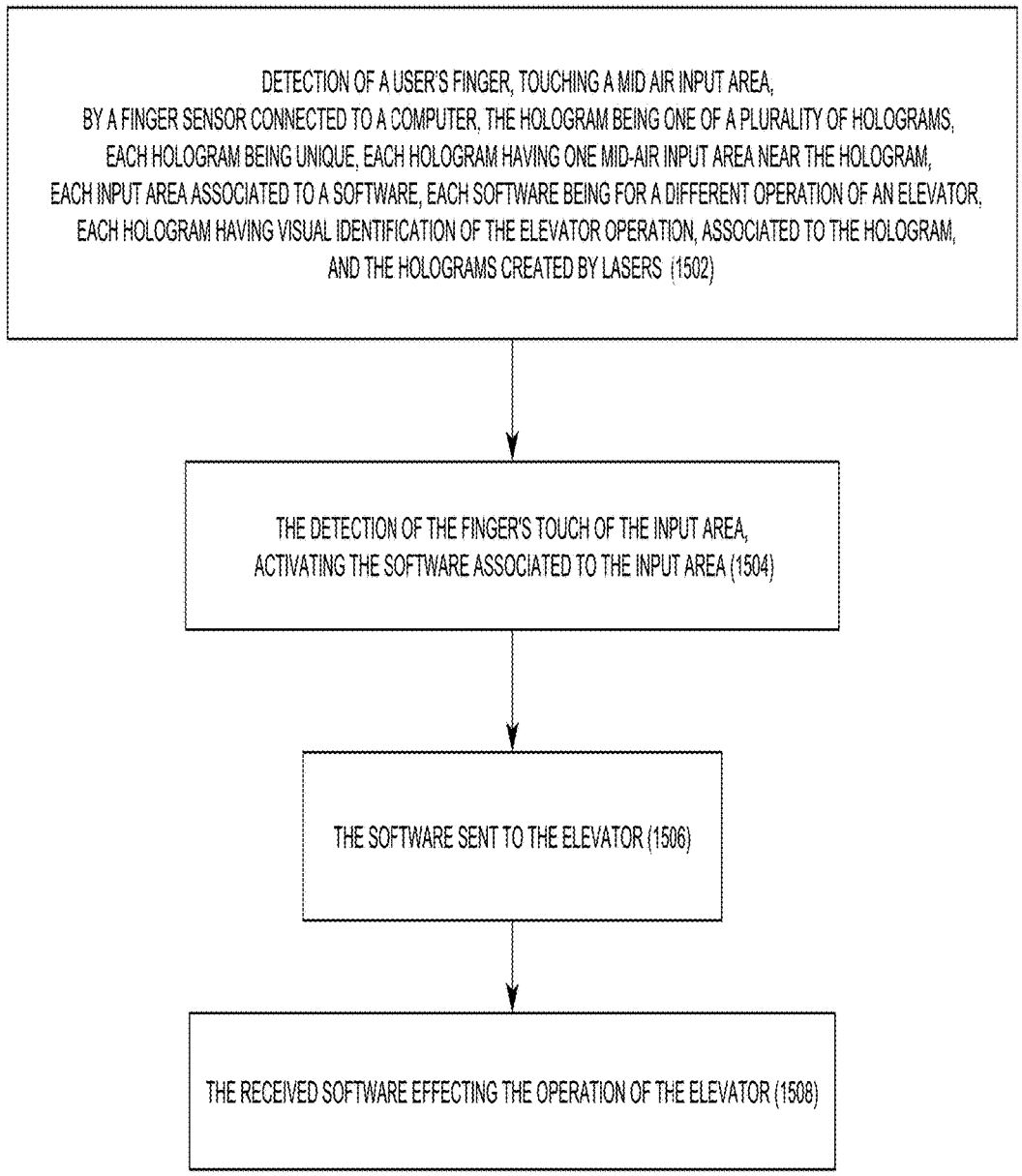
FIG. 15 is a flowchart illustrating a method of operating an elevator with a holographic control panel.

In the elevator control panel, a software and operation flowchart, the following steps illustrate the panel's operation, as shown in FIG. 15, detection of a user's finger, touching a mid air input area, by a finger sensor connected to a computer, the hologram being one of a plurality of holograms, each hologram being unique, each hologram having one mid-air input area near the hologram, each input area associated to a software, each software being for a different operation of an elevator, each hologram having visual identification of the elevator operation, associated to the hologram, and the holograms created by lasers (1502), the detection of the finger's touch of the input area, activating the software associated to the input area (1504), the software sent to the elevator (1506), the received software effecting the operation of the elevator (1508).

Block Diagram of Components

Figure 16:
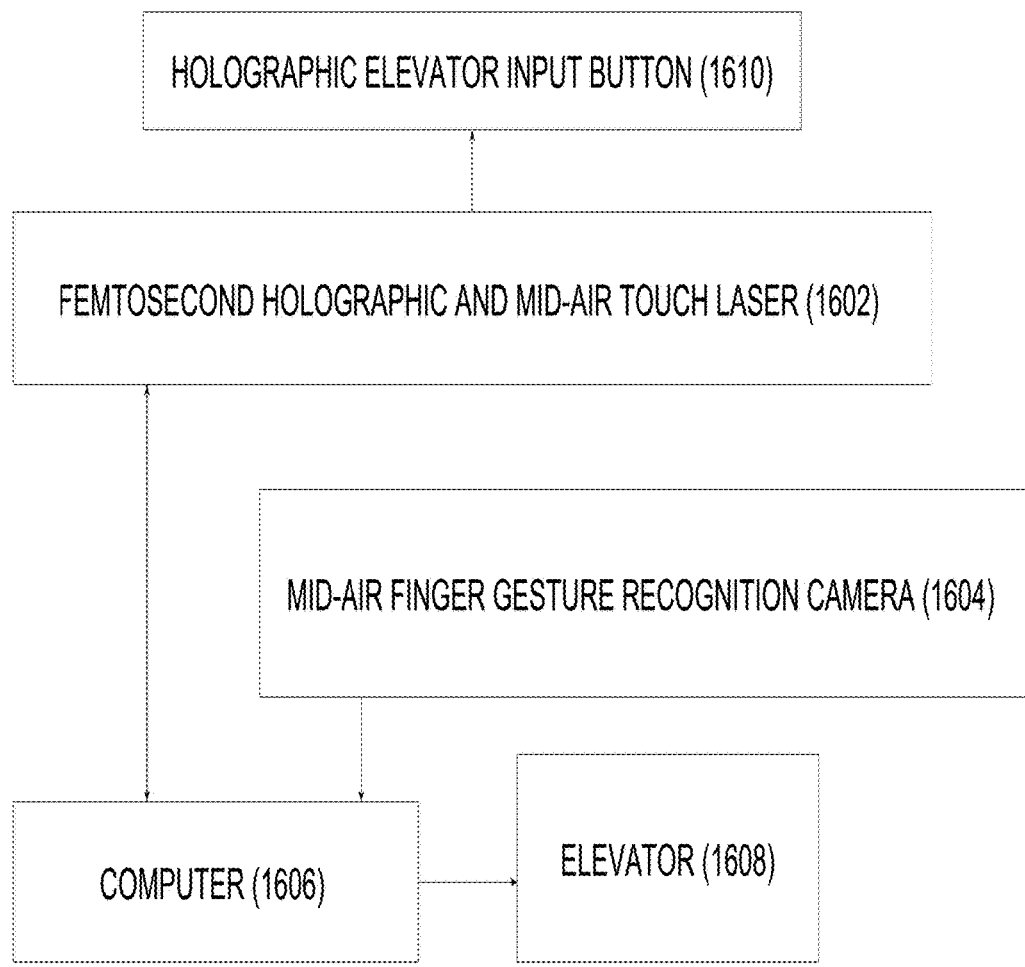
FIG. 16 shows a block diagram, of the connections between the hardware components, between a holographic elevator control panel, which is connected to an elevator.

A block diagram of the connections between the hardware components, used to create the holographic elevator control panel, are shown in FIG. 16, femtosecond holographic and mid-air touch laser (1602), mid-air finger gesture recognition camera (1604), computer (1606), elevator (1608), holographic elevator input button (1610).

Holographic Elevator Control Panel Operation

Mid-air touch input of one of the holograms, by the user's finger, inputs a request to the computer, as illustrated in FIGS. 12 and 13. The computer directs the elevator, to carry out the input request of the user.

For example, the user touches a 4 floor input hologram while inside an elevator. The 4 floor input is detected by the sensor and the computer. The computer directs the elevator, to move to the 4 floor. The number 4 is illuminated on the display. The displayed number, visually shows the elevators destination.

The camera detects a user's finger's contact, with the mid-air touch input area. The finger's contact with the input area is interpreted, by the computer, as a touch input of the elevator function associated to the hologram. The interpreted input is associated with an elevator function, in the computer. The computer elevator function is activated. The computer elevator function sends operating instruction to the elevator. The received instructions, effect the operation of the elevator.

When one of the holograms is contacted, it's shape or design changes, to show the destination floor has been requested, such as, diagonal lines 626 appearing in a number seven 7 hologram 610. The change in shape, and or design of the hologram will stay, after the finger stops contact with the hologram, such as, the diagonal lines 626 in the number 7.

In the case of multiple finger touching multiple buttons. The first button that is touched is activated, even if other fingers touch other buttons. To activate another button, the fingers have to be withdrawn from the touched buttons, and the finger has to contact one of the buttons again to enter a second button. Alternatively, the activation of the buttons, can be set to activate the next button touched, even if the fingers aren't with drawn from the other buttons.

A Smart Toilet's Control Panel's Use of Holograms Description

Figure 10:
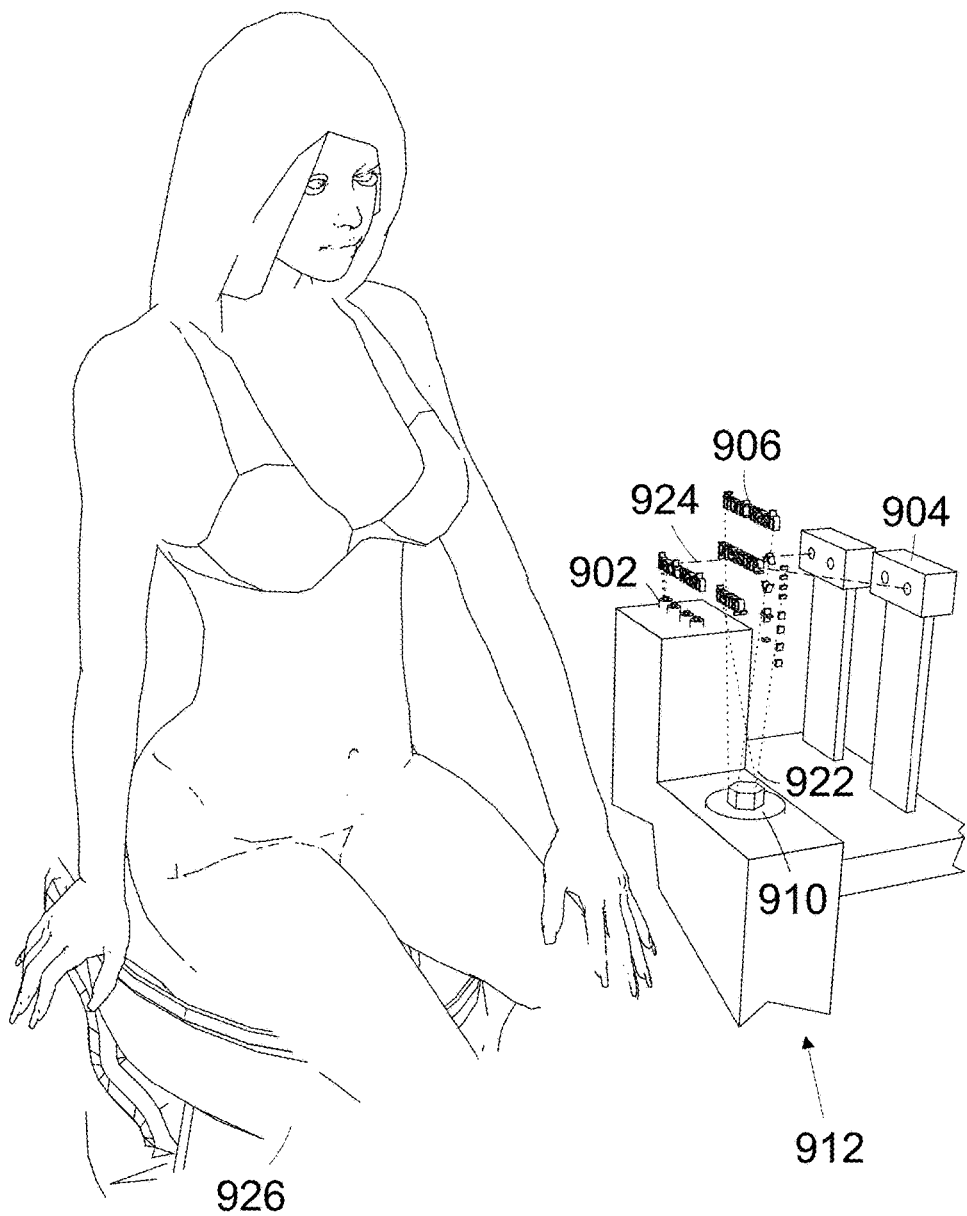
FIGS. 10 and 11 shows a perspective of view a mid-air touch input toilet control panel.
Figure 11:
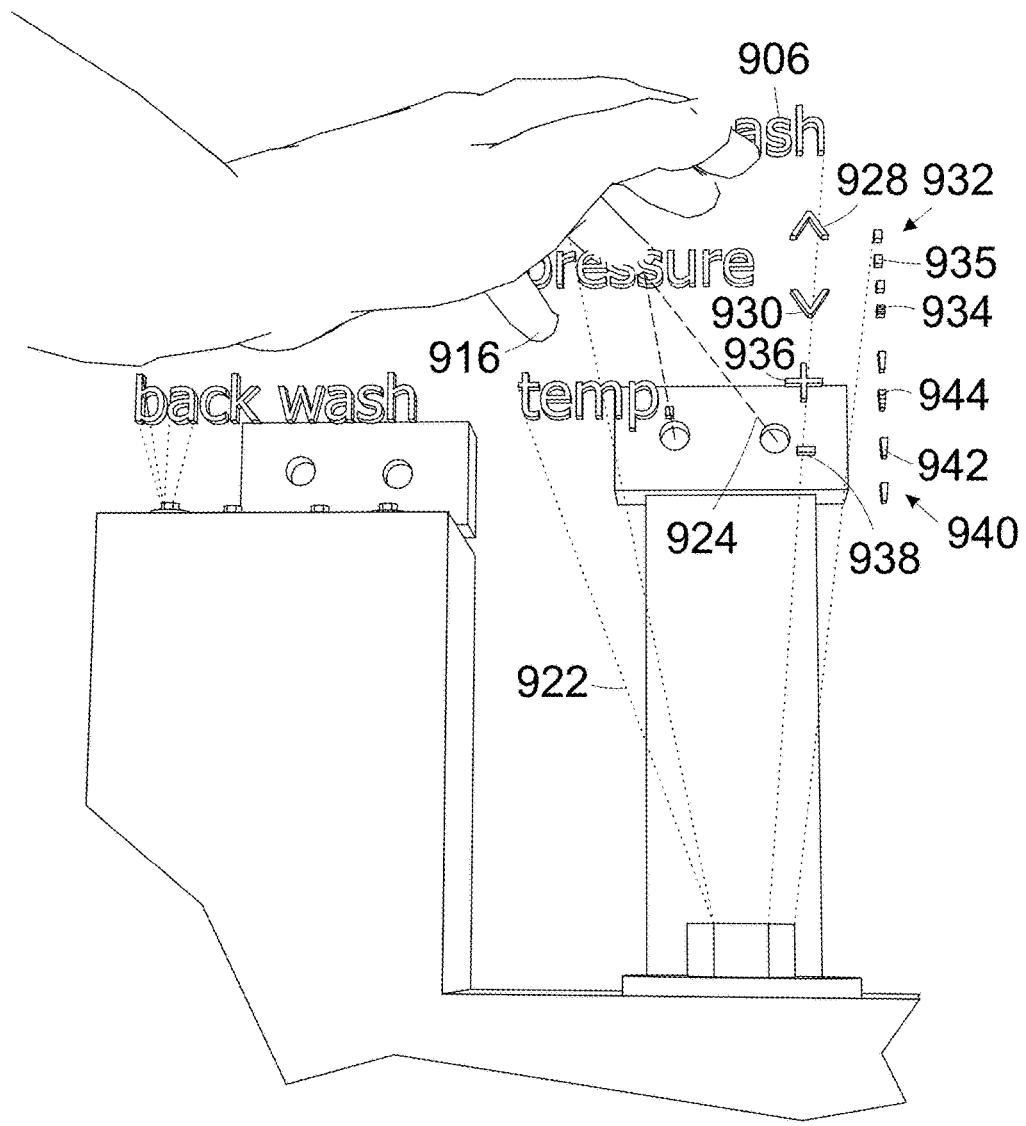

Femtosecond laser device lasers 902 are positioned to create a smart toilet control panel, as illustrated in FIGS. 10 and 11. The lasers are positioned, to each project a hologram, with laser beams 922. The holograms 906 are 12 cm from the lasers. The holograms are spaced 1 cm horizontally from each other. A big Femtosecond laser device 910 creates a holographic smart toilet control panel display 912, 14 cm from the laser.

The holograms 906 can be directed outward from the laser at distances ranging from 2 cm to 4 meters or more. The holograms can start at 2 cm and got out to 4 meters. The holograms can be different sizes ranging from 2 cubic cm to 3 cubic meters or more.

Individual holograms, and the big laser hologram 906 visually show an input for a smart toilet, such as, back wash, and increase water pressure, etc. The lasers are connected to a computer. The computer is connected to a smart toilet 926.

Two Intel Creative Senz 3D Peripheral Camera mid-air hand gesture recognition cameras 904, are located to view a user's finger's 916 contact within a predetermined mid-air area. The predetermined viewing areas 924 are located 0.2 cm below the area's which are occupied by the holograms.

A display (not shown), and the cameras are connected to the computer. The viewing range of the Intel camera is from 20 cm to 3.25 meters.

A Smart Toilet's Control Panel's Use of Holograms Operation

Mid-air touch input of one of the holograms, by the user's finger, inputs a request to the computer, as illustrated in FIGS. 10 and 11. The computer directs the smart toilet to carry out the input request of the user. For example, the user touches a front wash input hologram. The front wash input is detected by the sensor, and the computer. The computer directs the smart toilet, to start a front wash.

The wash pressure can be increased or decreased, by touching an increase 928 or decrease hologram 930. The increased or decreased desired pressure in shown on an indicator 935 hologram on a water pressure scale 1032. The pressure of the wash is shown on the pressure scale, by indicator lines 934, shown on one of the pressure indicating holograms 934. The water pressure scale 932 shows from a low to high pressure range.

The wash water temperature can be increased or decreased, by touching an increase 936 or decrease hologram 938. The increased or decreased desired temperature in shown on an indicator 942 hologram on a water temperature scale 1040. The temperature of the wash is shown on the temperature scale, by indicator lines 944, shown on one of the temperature indicating holograms 944. The water temperature scale 940 shows from a low to high temperature range. Other toilet settings can include, water spray patterns, such as, an oscillating spray.

A Holographic Keyboard Description

Figure 3:
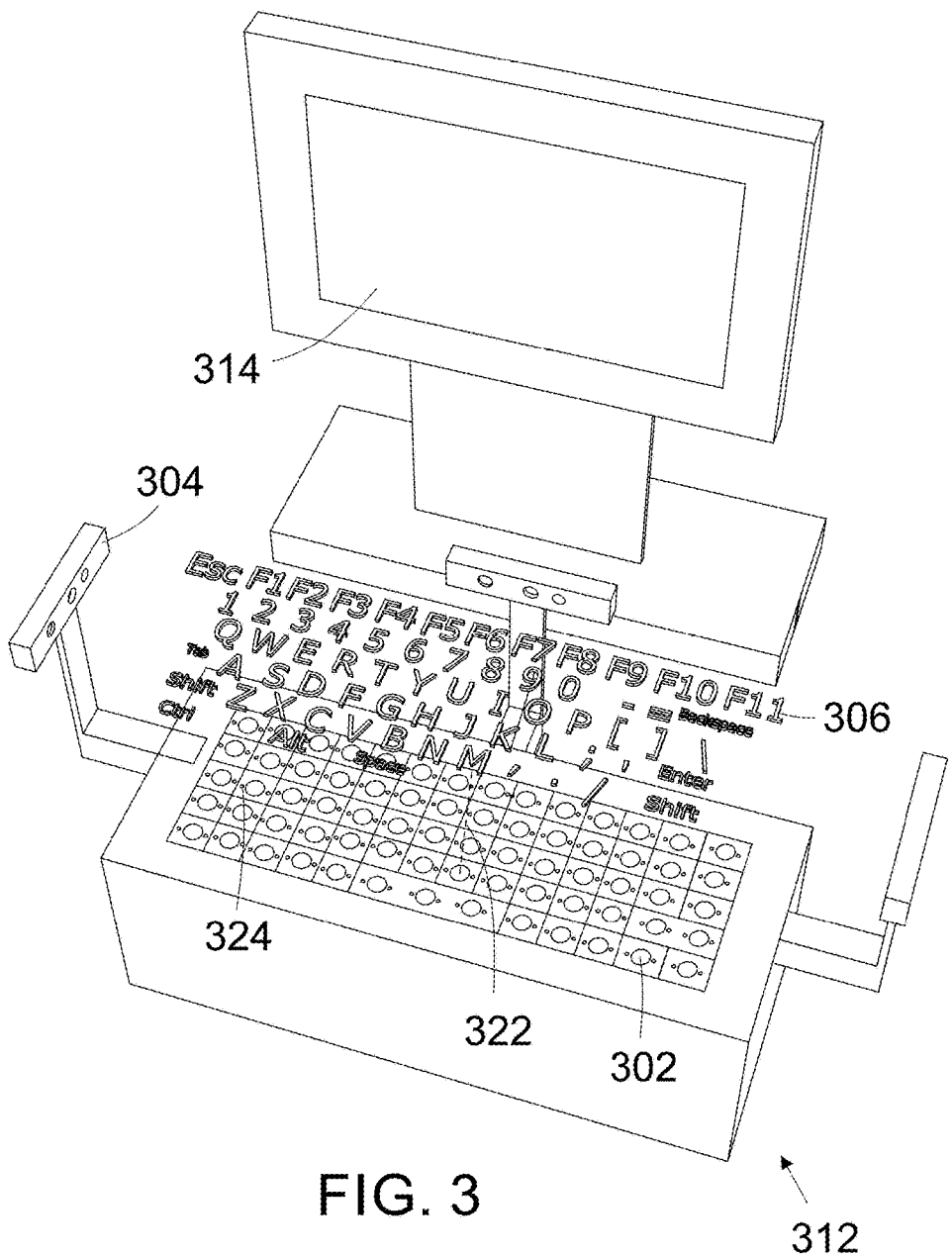
FIG. 3 shows a perspective view of a mid-air touch input keyboard, femtosecond laser devices, hand gesture recognition cameras and a display.

A mid-air keyboard 312 is created by grouping a plurality of fiber optic femtosecond pulse lasers. The lasers are positioned, to each project a hologram 306, as illustrated in FIG. 3. Mid-air haptic touch 306 is located in the same area as the holograms 306. One laser is used for each symbol, such as, 144 or more lasers, projecting a letter, or symbol. The symbols change when the shift key is activated, such as, the letters change from small letters, to capital letters, numbers change to symbols, etc.

Five or more 104 femtosecond lasers 302 could also be positioned, to each project a laser beam 322 and create a hologram 12 cm from the lasers. The holograms 306 are spaced 0.4 CM horizontally from each other.

The holograms are arranged in a qwerty keyboard pattern, with letters, numbers, punctuation, and symbols. Each laser projects a group of unique numbers, letters, numbers, punctuation symbols, or input commands. The holograms make up the keys, found on a keyboard. The keys include number's 1 to 10, such as, 1, 2, 3, etc. The alphabet from a to z, such as, a, b, c, d, etc., punctuation, such as, /, ', symbols, such as, @, *, &, etc., and commands, such as, enter, and shift, etc. Two lasers 346 are arranged close together to spell out words 348, such as, enter.

Ultrasonic mid-air finger locators 324 are positioned to view each key, to locate the fingers contact with the input area. Three realsense mid-air hand gesture recognition cameras 304, are located to sense a user's finger's contact with the predetermined mid-air input areas. The predetermined input areas are located 0.2 cm below the areas, which are occupied by the holograms.

A display 314 is connected to the computer. The cameras, ultrasonic sensors, and lasers, are connected to the computer. The keyboard 312 is located in a static electric free environment, such as, a static free computer chips manufacturing plant, or a space station in outer space.

A Holographic Keyboard Operation

The user touches the holograms, views an increase in luminosity of the touched hologram 306, and feels mid-air touch 306 from the hologram, as illustrated in FIG. 3. The user moves their finger just a little through the hologram 306, and inputs the hologram key they are touching.

The user can use the mid-air holograms 306 to input letters, numbers, punctuation, and symbols in to the computer. The input of the keyboard letters, numbers, etc., is shown on the display 314. The input commands can affect the operation of the computer. The computer can be connected to a device, to effect the operation of the device. The keyboard can be used in a medical hospital environment. The keyboard is used in hospital surgery rooms, to hygienically touch input, into the computer while operating. The letters 306 inputted into the keyboard 312, are shown on the display.

A Store Payment Station's Use of Holograms Description

Fiber optic femtosecond pulse lasers 1402 are positioned, to each use laser beams 1412, to project a hologram ten key input pad 1406. The pad 1406 is part of a store checkout payment station 1414, in FIGS. 14A and 14B. The lasers are positioned, to each project a hologram 1416. The holograms are 5 cm from the lasers. The holograms are spaced 1 cm horizontally from each other.

The lasers are connected to a computer. The computer is connected to the payment station 1414. Mid-air hand gesture recognition sensors 1404, are located to sense a user's finger's contact within predetermined mid-air areas. The predetermined areas are located 0.2 cm below the area's which are occupied by the holograms. A display, and the gesture recognition sensors are connected to the computer.

The station has two credit card readers 1418. The display 1420, shows information, such as, the total price of the items to be purchased, and is viewable by the user.

A Store Payment Station's Use of Holograms Operation

Figure 14A:
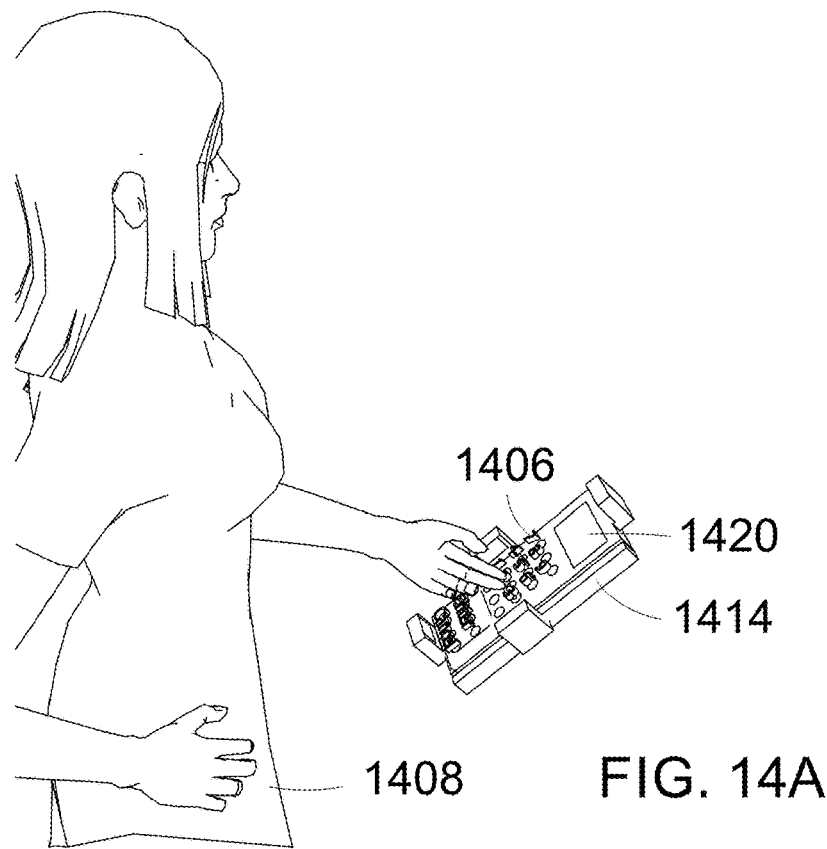
FIGS. 14A and 14B, shows a perspective view of a femtosecond lasers, gesture recognition cameras, and a laser mid-air touch input display, incorporated into a store payment device.
Figure 14B:
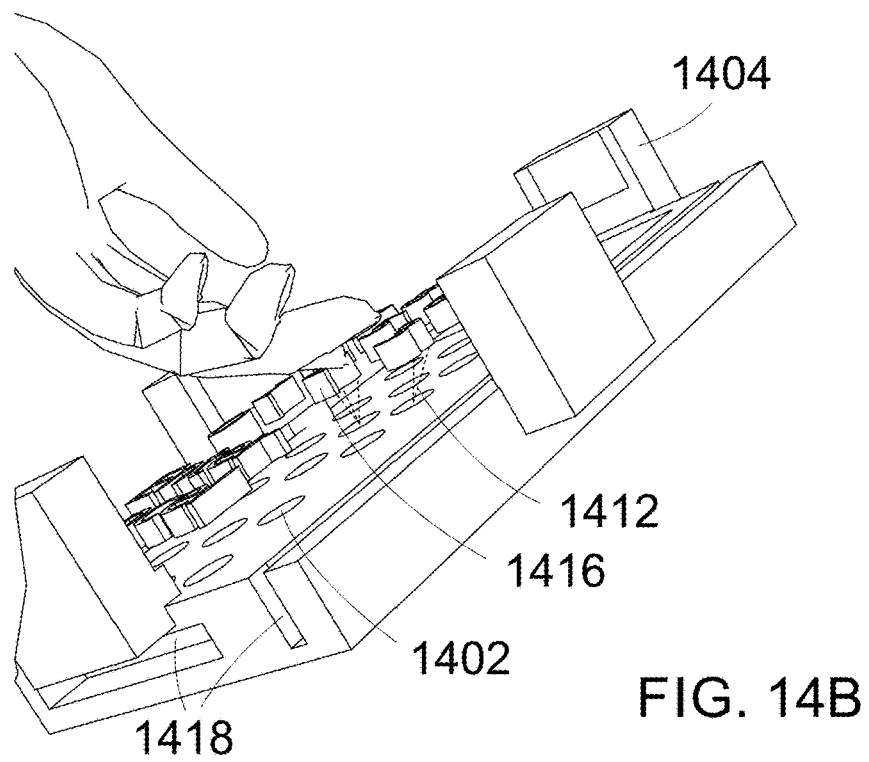

The ten key pad holograms, are located adjacent to the display, in FIGS. 14A and 14B. The holograms are arranged in a ten key number input pad pattern. Each laser projects a unique number, from the number's 1 to 10, such as, 1, 2, 3, 4, 5, 6, 7, 8 9, 0.

A user 1408 inputs numbers into the pad 1406, by individually touching one of the numbers. The numbers can be entered, to input a debit card pin numbers into the computer. The input can be shown on the display 1420. A credit card can be read by the card readers.

Car Dashboard Input Holograms Description

Figure 4:
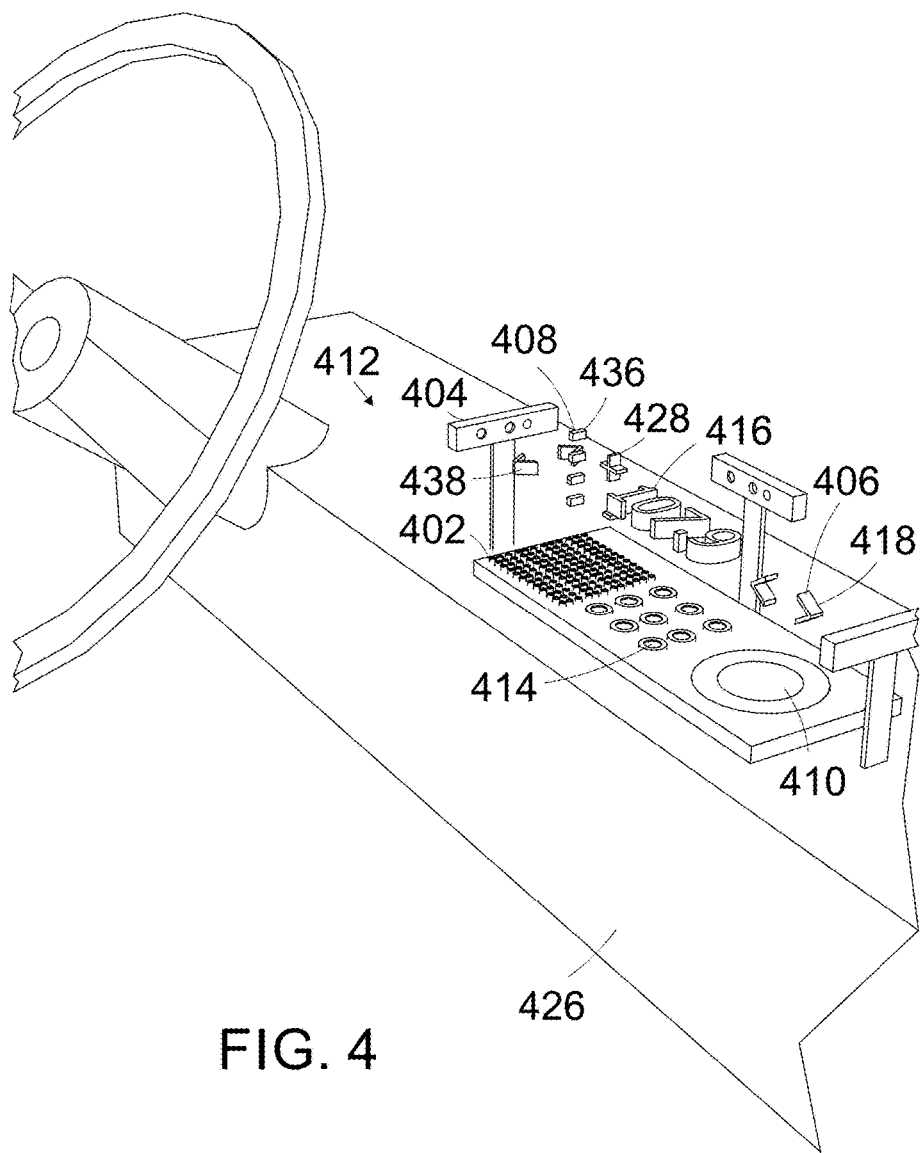
FIG. 4 shows a perspective view of touch input holograms arranged as a car control panel, femtosecond laser devices, and hand gesture recognition cameras

Fiber optic femtosecond pulse lasers are positioned, to each project a hologram 406. A hundred and forty-four 144 small femtosecond lasers 402, nine 9 medium 414 femtosecond lasers, one big small femtosecond laser 410, is positioned on top of a car auto dash board 426. More lasers can be used to increase the input option commands available to a user. In FIG. 4.

The small 402, and medium lasers, can project holograms that are individual objects, or holograms that are combined together to make up an individual hologram shape. Holographic object software stitching is used, to combine the holograms to make the single hologram shape image. The lasers can also make individual holograms. The big laser can make an individual hologram display, or combine with the other holograms to make the display.

The holograms are from 5 to 14 cm from the lasers. The holograms have mid-air haptic touch 406. The holograms are spaced horizontally and vertically from each other. The holograms size can be from 1 cm cubed, to 35 cm cubed, or more.

Three realsense camera 404 are positioned to view a user's fingers contact with a mid-air input area 408. The mid-air input area is located, in the same area as the holograms. The gesture recognition sensors are connected to the computer, and the computer is connected to the lasers. A Leap midair hand gesture recognition sensor, or Pico Cambord 3D camera, could also be used.

One hologram displays an increase symbol 428, a second hologram displays a decrease symbol 430, and a third hologram displays a, toggle, or change car component, symbol 432.

The car can be a public self driving car. The car drives itself. The car is used by different occupants. The different occupants use the car in a similar fashion, as a self driving taxi, or mini bus, etc. The car can also be a car, solely driven by the user.

The chance of being exposed to bacteria, and or viruses, from other users, is decreased, by touch inputting in to the holograms, to operate the self driving car. The knowledge that the users are protected from bacteria, while operating the car, makes the usage of the car more attractive to users.

The lasers project a user interface 412 above the car dash board 426, and within touching distance of driver or passenger. The interface includes car components commands, such as, radio station search, pre-set radio stations, increase or decrease radio volume, heat increase or decrease, fan speed increase or decrease, windshield wipers on, wiper speed increase or decrease, ground positioning system (GPS) map, headlights on, headlight low or high beam, etc.

Car instruments can be displayed by holograms, such as, speedometer, engine revolutions, engine oil alert, and engine temperature alert, etc.

The radio hologram interface includes, a graphic station number indicator 416, a sound volume indictor 436, a switch to another device switch 418, sound volume increase or decrease holograms 438, radio station change station increase or decrease holograms 428.

The holograms create a global position system GPS Head-Up Display HUD of a street map, with the user's location shown on the map (not shown). The map moves in relation to the cars movement. The computer receives navigation information from a smartphone. The laser projects the display in mid-air between the user and the car windshield, leaving room for the user to view the road while driving. A holographic heads-up display can be created by the holograms.

If a pedestrian or vehicle is detected, to close to the car, or on a course where the pedestrian or vehicle may contact the car and the pedestrian is highlighted holographic ally on the windshield. The pedestrian or vehicle is viewable with a red flashing outline, halo around the pedestrian.

The highlighting allows the driver to take action to avoid possible contact with the pedestrian or vehicle. The pedestrian or vehicle is detected using sensors, such as, LIDAR, radar, pedestrian or vehicle cameras and sensors on the car (not show).

The display shows information, such as, street maps, displayed in human readable format, turn-by-turn navigation directions using visual, and or speech, from a speaker Car Dashboard Input Holograms Operation A user can maintain their view of the road while driving, and operate components of a vehicle without having to take their eyes off the road, by touching holograms which are in direct view of the user. In FIG. 4, the holograms act as the heads up display. The display shows touch input commands, which are used to operate the various car components.

For example, the user can increase the volume of the radio, by touching the increase symbol 438, or decrease the volume of the radio by touching the decrease volume symbol 430. The user can view, the volume of the radio on the volume indicator 436. The user can view, the radio station 416 the radio is tuned to. The user can change the station, by touching the radio station change station increase or decrease holograms 428. The user can switch between the radio receiving, amplitude modulation AM, and frequency modulation FM radio waves, by touching the change car component symbol 432.

When the change component symbol hologram 418 is touched it goes to the next component, and displays the components hologram interface. Other components include, climate control heat, and head light brightness, etc. The change holograms image changes to represent the competent is use, such as, a musical note symbol is shown when the radio is on, or a light bulb is shown when the lights are chosen for input, etc.

The user can turn on the head lights by contacting the turn on head lights hologram (not shown) with their finger. The user's finger's contact with the light hologram is detected by the sensor and the connected computer. The computer activates the turn headlight on function. The computer sends instructions to the headlights switch to turn on the headlights. The light switch is switched to the on position, the lights are turned on.

The holograms can be used for different devices, by changing the components the holograms are associated to. The change to another device switch of the input holograms 418 is used to switch or toggle between the different components. For example, the holograms may be used in the operation of the radio, the user can switch their association to a next component, such as, the operation of a ground positioning system GPS map display, or the air heating system, etc.

The holograms can remain continually activated, or can be turned on and off, by the user moving their hand to contact a turn off or turn on off hologram (not shown).

A 2D Holographic Input Display Description

Fiber optic femtosecond pulse lasers 1802 are positioned, to each project a hologram 1806. Small, medium, and large femtosecond lasers 1802 are positioned together to create a holographic mid-air touch display, shown in FIG. 18. A computer is connected to the lasers.

The lasers 1802 are arranged close together to create desktop touch input icons. The holograms are arranged in a computer desktop touch screen configuration. The input icons can be either two dimensional 2D 1812 or 3 dimensional 1808, and can simultaneously be created. The display panel 1812 can be parallel to the lasers 1802, or be at angles to the lasers.

Realsense mid-air hand gesture recognition cameras 1804, are located to sense a user's finger's contact with the holograms.

The display 1812 can also show individual number icons, or a menu of input items, or web pages, which can be touched in mid-air. Each differing icon, is associated with a different computer function. Each differing computer function can effect a different operation of a device. The finger's contact with one of the icons, activates the icon, and activates the computer function associated with the icon.

A 2D Holographic Input Display Operation

Figure 18:
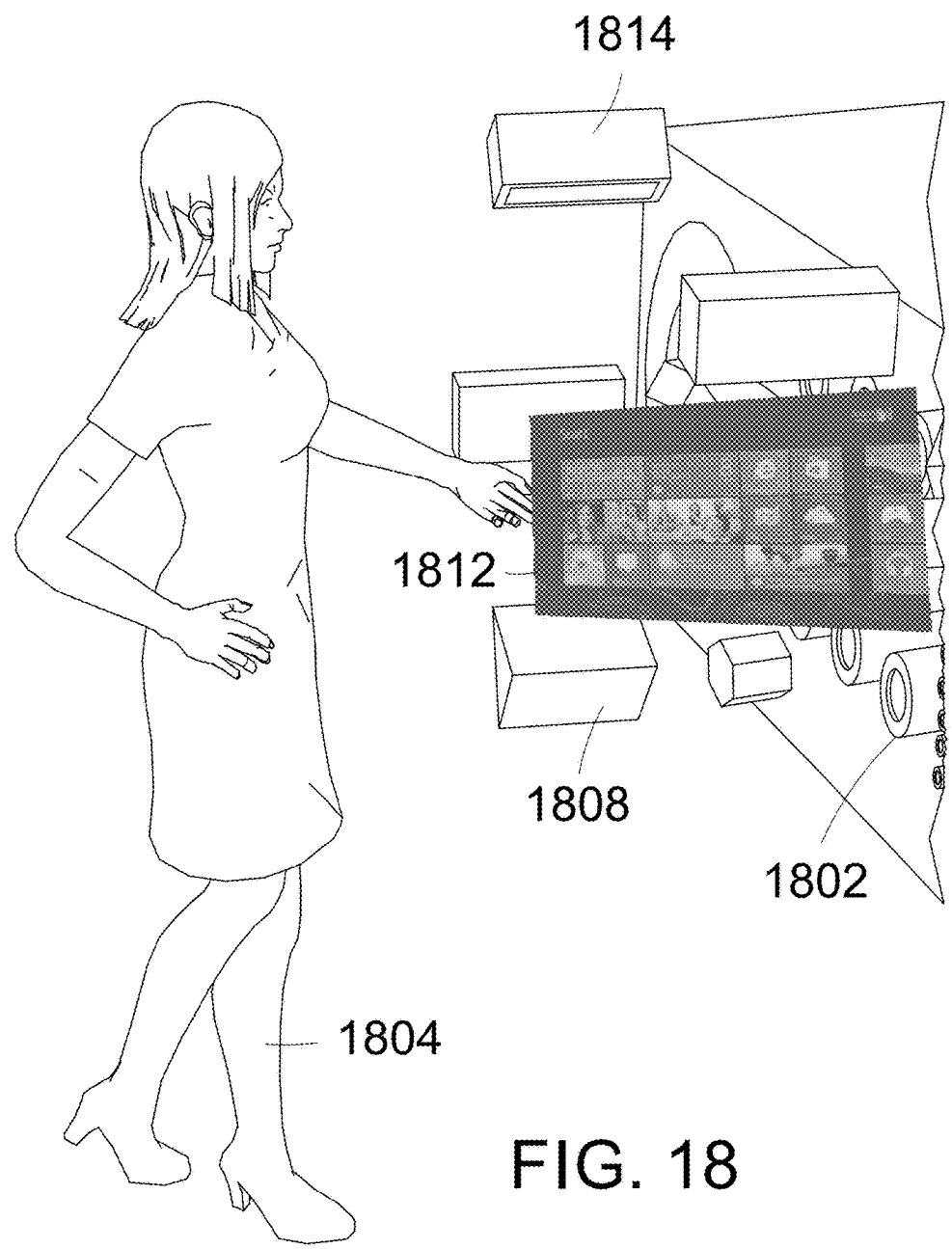
FIG. 18 shows a perspective of view a mid-air touch input two dimensional and three dimensional display.

The user 1808 touches the holograms and views and increase in luminosity of the hologram, and feels mid-air touch 1806 from the hologram, shown in FIG. 18. The user touches the display hologram 1812 and inputs the input associated with the hologram.

The user can use the mid-air holograms 1806 to input, in to the computer, letters, numbers, punctuation, and symbols. The user can activate mid-air icons 1812, open internet browsing web pages 1814, word documents, and play computer games, The input of the keyboard letters, numbers, etc., is shown on the display 106. The input commands can affect the operation of the computer. The computer can be connected to a device, such as, a printer, to effect the operation of the printer. The computer can connect to the internet, and access content on the internet The display senses a user's finger contacting one of a plurality of midair display icons, in mid-air and on the display. The display interprets the finger's contact with the icon, as a touch input activation of the icon. The activation of the icon, activates the computer function associated with the icon. The display can also be a keyboard other than a qwerty keyboard, and or different touch input icons.

A 3D Holographic Input Display Description

Figure 17:
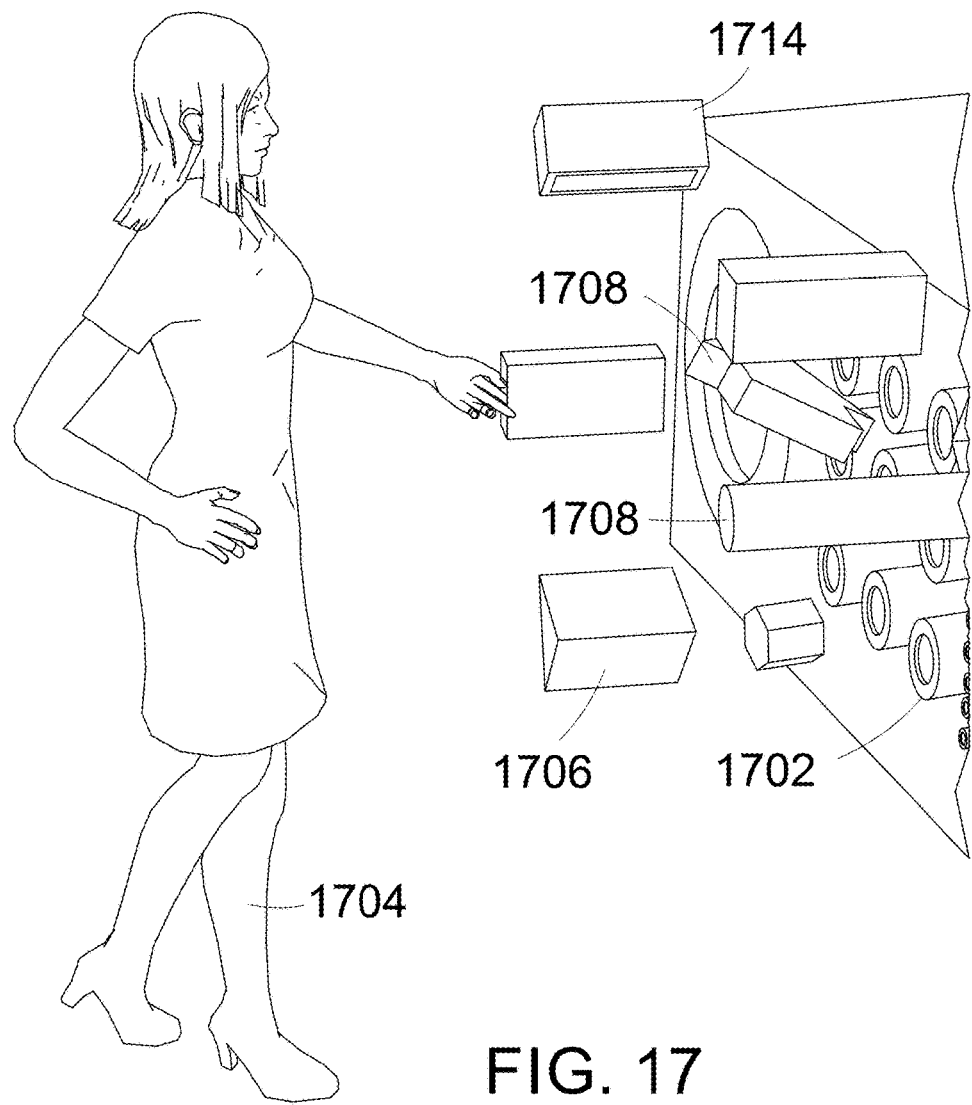
FIG. 17 shows a perspective of view a mid-air touch input three dimensional display.

Femtosecond lasers 1702 are positioned, to create holographic mid-air touch holograms 1706, shown in FIG. 17. Gesture recognition sensors 1714 detect a user's touch of the holograms.

The lasers 1702 are arranged close together to create desktop touch input icons. The holograms are arranged in a computer desktop touch screen configuration. The input icons 3 dimensional 3D. The holograms can extend outward 1708 from the laser, or be located at a distance from the laser 1706.

A 3D Holographic Input Display Operation

The user 1704 touches the hologram 1712, and inputs, the input associated with the hologram 1706, shown in FIG. 17.

A Medical Device Connected to Holo with Touch Input Description

Holograms are positioned, for a user to touch the holograms. The holograms are created by a femtosecond laser, (not shown). The holograms are in mid-air, and have haptic touch. A computer is connected to the laser. The lasers could also create holograms without being connected to the computer. A camera. is connected to the computer. The computer is connected to a medical device. The medical device could be an operating room patient health monitor, or a hospital bed, etc.

A Software for Operating the Assemblage of Devices

A software is programmed into the computer. The software has computer instructions. The software in the computer has operating instructions for the medical device.

Each different hologram, is associated to a unique different operating instruction for the operation of the medical device. The activation of one of the different Computer operating instructions, is associated to the touch input of each hologram. Each different computer instruction is a different or unique instruction for the operation of the medical device.

The touch of one of the holograms activates the computer instructions, associated to the hologram. The computer sends activated instructions to the device. The device uses the received instructions to effect the operation of the device.

Medical device computer instructions may include, turning the device on or off, or letters which create words on a display. The software also has instructions for creating visual shapes, colors, brightness, movement, and designs of the holograms. The software operates the femtosecond laser device.

Detection of The User's Finger Near the Hologram Perceived as A Touch Input

The camera is positioned to view the user's finger, near, at a predetermined distance of 2 centimeters CM near one of the holograms. When the user's finger is detected near an activation plane to the hologram, the computer is programmed to perceive that as a touch input. Other activation planes can be set, such as, the touching of the hologram, or touching an activation plane after the finger has passed through the hologram.

Different Activation Zones Effecting the Device Differently

The different activation zones can be associated to a hologram. The zones can be used simultaneously, to input different commands. Different inputs can be associated to each zone, for example, one zone can be the user's finger near the hologram.

A second zone can be the turning off of the computer instructions when the finger touches the hologram. A third zone can be used to activate a different operation of the device, when the user's finger travel through the hologram and contacts the activation zone on other side of the hologram. Additional zone and touch combinations can input different commands.

A Medical Device Using Holo for Touch Input Operation

The user views the different hologram button inputs. Each button is associated to a selection of one of a variety of device operations. The user chooses a hologram or combination of different holograms to touch input. The touch input inputs one of the desired device operation's. The user touches the chosen hologram. The touch of the hologram, activates the computer instructions for an operation of the device The computer instructions are associated to the hologram. The activated instructions are sent to the device. The device receives the computer instructions. The uses the instructions to operate the medical device A User Raising a Hospital Bed To control the bed the user's finger touches the on hologram. To raise the bed, the user, brings their finger 1 cm from a hologram to the raise bed. To increase the speed of the of the raising of the bed, the user touches the hologram. To slow the raising of the bed, the user touches 2 cm through the hologram. To stop the raising of the bed the user removes their finger, outside of the 2 CM area from the hologram.

A Vending Machine Using Holo for Touch Input Description

A vending machine is connected to a femtosecond laser device. Holograms associated to an operation of the vending machine, may include, a variety of different holograms, or hologram inputs, such as, numbers or letters, for selecting a variety of different products.

A Vending Machine Using Holo for Touch Input Operation

The user views the different hologram button inputs associated to the selection of one of the variety of products as illustrated in fig. The user chooses a hologram or combination of different holograms, that the user desires to input, to select the desired product. The user touches the hologram of the input the user wants to input into the vending machine. The machine uses the user's input, to activate machine instructions to operate the machine. Operations of the machine, may include, receiving a selection of a product request, and the delivery of the product to the user.

An Automated Teller Machine Using Holo for Touch Input Description

An automated teller machine ATM is connected to femtosecond laser devices. Holograms associated to an operation of the ATM, may include, a variety of different holograms, or hologram inputs, such as, numbers or letters, for selecting a variety of different products.

Ten femtosecond laser devices are positioned, to each project a hologram 9 cm from the lasers. The holograms are spaced 0.2 cm horizontally from each other The holograms could be projected farther from the laser, such as, 12 cm, 16 cm, or 23 cm, etc. The holograms are associated to, and display numbers 0-9.

Four lasers are positioned to each project a hologram 9 cm from the lasers, and which are located 0.2 cm from each other. The displayed text, includes, deposit, enter, and change, etc.

A Leap mid-air hand gesture recognition sensor, is located to sense a user's finger's contact within predetermined mid-air areas. The predetermined areas are located 0.2 cm below the holograms.

An Automated Teller Machine Using Holo for Touch Input Operation

The user views the different hologram button inputs associated to the selection of one of the variety of financial products as illustrated in fig. The user chooses a hologram or combination of different holograms, that the user desires to input, to select the desired product.

The user touches the hologram of the input the user wants to input into the ATM. The machine uses the user's input to activate machine instructions to operate the machine. Operations of the machine, may include, receiving a selection of a product request dispensing funds, and the delivery of the funds to the user.

The user can also touch the word holograms to input the displayed word option. The word holograms, include, deposit, enter, change, etc. The holographic input pad can also be used, to input into a vending machine, a public information interactive display, or a ticket kiosk, etc.

On Off Switch in a Dust Free Environment Description

Hologram input may be beneficial to input in a dust free environment, such as, microprocessor fabrication environments. Hologram input displays don't have moving parts. Displays with moving parts, may create dust.

When a finger or glove touches a surface to input, the touching of the finger to the surface, creates friction between the finger and the surface. The friction causes particles from both surfaces detaching from the surfaces, and becoming airborne. The particles then descend to a surface, which creates dust on the surface. Dust on the surface of a microprocessor, may have a negative impact on the microprocessor's production.

Figure 2:
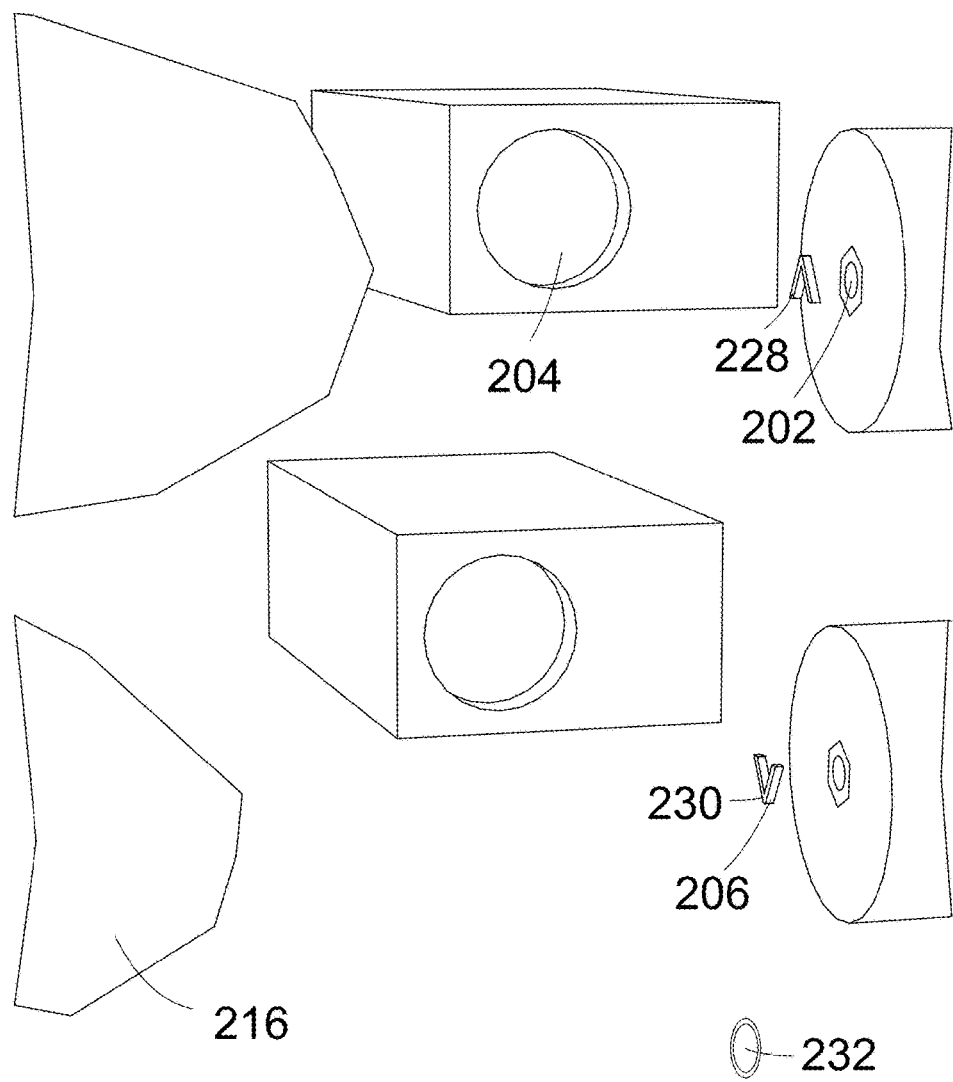
FIG. 2 is a perspective view of a mid-air hologram, arranged as a touch input button for an on off switch in a dust free environment.

Two femtosecond lasers 202 are positioned to project holograms 6 cm from the lasers, and which are located 3 cm horizontally from each other, as illustrated in FIG. 2. The holograms are from 0.03 to 2 cm in diameter. One laser projects an up, or on symbol 228 in mid-air, the second laser projects a down, or off symbol 230 in mid-air. The lasers are connected to a computer. The lasers create aerial buttons with haptic feedback 206, or floating buttons with haptic feedback 206.

A Leap mid-air hand gesture recognition sensor 204, is located to have an operational view of the holograms, to sense a user's finger's contact with predetermined input areas near the holograms. Leap sensor software is programmed into the computer. The predetermined mid-air areas are located 0.2 cm below the area's which are occupied by the holograms. A device (not shown) is connected to the computer. A speaker 232 is connected to the computer.

On Off Switch in a Dust Free Environment Operation

The user views the different hologram button inputs. Each button is associated to a selection, of one of a variety of operations of a device, in a dust free environment as illustrated in FIG. 2. The user chooses a hologram, to select the desired device operation.

The activated instructions, for the operation of the dust free device, is sent to the dust free device. Operations of the device, may include, the turning on or off of the device.

The software detects in the images from the camera, the user touching the activation area. The device operating instructions associated to the hologram, are activated. The activated instructions for the operation of the dust free environment device, are sent to the device. Operations of the device, may include, the turning on or off of the device.

The user can turn the device on or off, by touching in mid-air 0.2 cm below either the on 228 or off hologram 230. The detected touch is interpreted, as an input by the user, as illustrated in FIG. 2. The input is associated to, either an on or off input. The sensor connected to the computer, detects the touch of the area. The device's operation is affected by the input from the switch.

Locating the of touch input area below the holograms, allows the user to touch the hologram before committing to the touch input. The touch input occurs by moving their finger 216 forward, and closer to the laser hologram, and contacting the input area.

An audible sound is produced by a speaker 232 when the finger contacts the input area. The sound could be a beep sound, or a bell sound, etc. The sound informs the user that their finger has contacted the input area. A sound is produced 0.4 cm before the finger contacts the input area, to inform the user that their finger is close to contacting the input area.

A sound is produced by the speaker when the finger is 0.5 cm closer to the device then the input area, to inform the user that they are close to touching the device with their finger. The sound enables the user to move their finger away from the device, before contacting it with their finger.

A unique sound is associated to each hologram that is touched. The sound enables the user to audibly associate the sound, to the hologram they are touch activating.

A Device Operated in a Flammable Environment Description

Hologram input may be beneficial in a flammable environment. By eliminating electric discharge from a user's finger while touch inputting. Electric discharge might ignite airborne flammable particles.

A switch using holograms is operated in a flammable environment. The switch deceases the chance of a static electric spark from being created, such as, when the user's finger contacts an on off switch with an input surface. The chance of a flammable vapor or particle igniting in the flammable environment, is decreased, by decreasing the chance of a static electric spark.

Holograms associated to an operation of the device, may include, a variety of different holograms, or hologram inputs, such as, numbers or letters, and device commands for inputting into the device.

Electric discharge from the user's finger to a surface input button, is eliminated by touch inputting into one the holograms. The hologram is in midair, and isn't grounded. Eliminating the electric discharge, decreases the chance of an igniting flammable material, or combustible vapors in the flammable environment.

Flammable environments can include, grain elevators with grain dust, petroleum refineries, and hydrocarbon carrying oil tankers

A Device Operated in a Flammable Environment Operation

The user views the different hologram button inputs. Each button is associated to a selection of one of a variety of device operations as illustrated in fig. The user chooses a hologram or combination of different hologram to input, and to select the desired device operation.

The activated instructions for the operation of the device in the flammable environment are sent to the device in the flammable environment. Operations of the device, may include, the turning on or off of the device, etc.

Different Input Panels can be Created to Operate Different Devices from One Laser Array Description and Operation Space is saved by using a changeable hologram input control panel. Instead of different devices each having a physical input control panel. The touch input holograms view, color and shape can be changed, when operating different devices. The input holograms view, color and shape are created to be specific to the device, that the input button are associated to.

Hologram input control panels can be created to operate different devices. One mid-air input device can be used for operating a variety for different device. For example, on a space station, where space is a consideration, the mid-air input device can operate, a space station moving arm, and then in a different input configuration, the input device can operate a station camera. The different devices are connected to a computer, of a laser device.

A hologram on button for the space station moving arm, can be a hologram of an orange. When the control panel is changed to operate a different device, such as, the camera, the on button can be a hologram of an blue diamond.

Viewing and Touching Holograms of Objects Description

Figure 8:
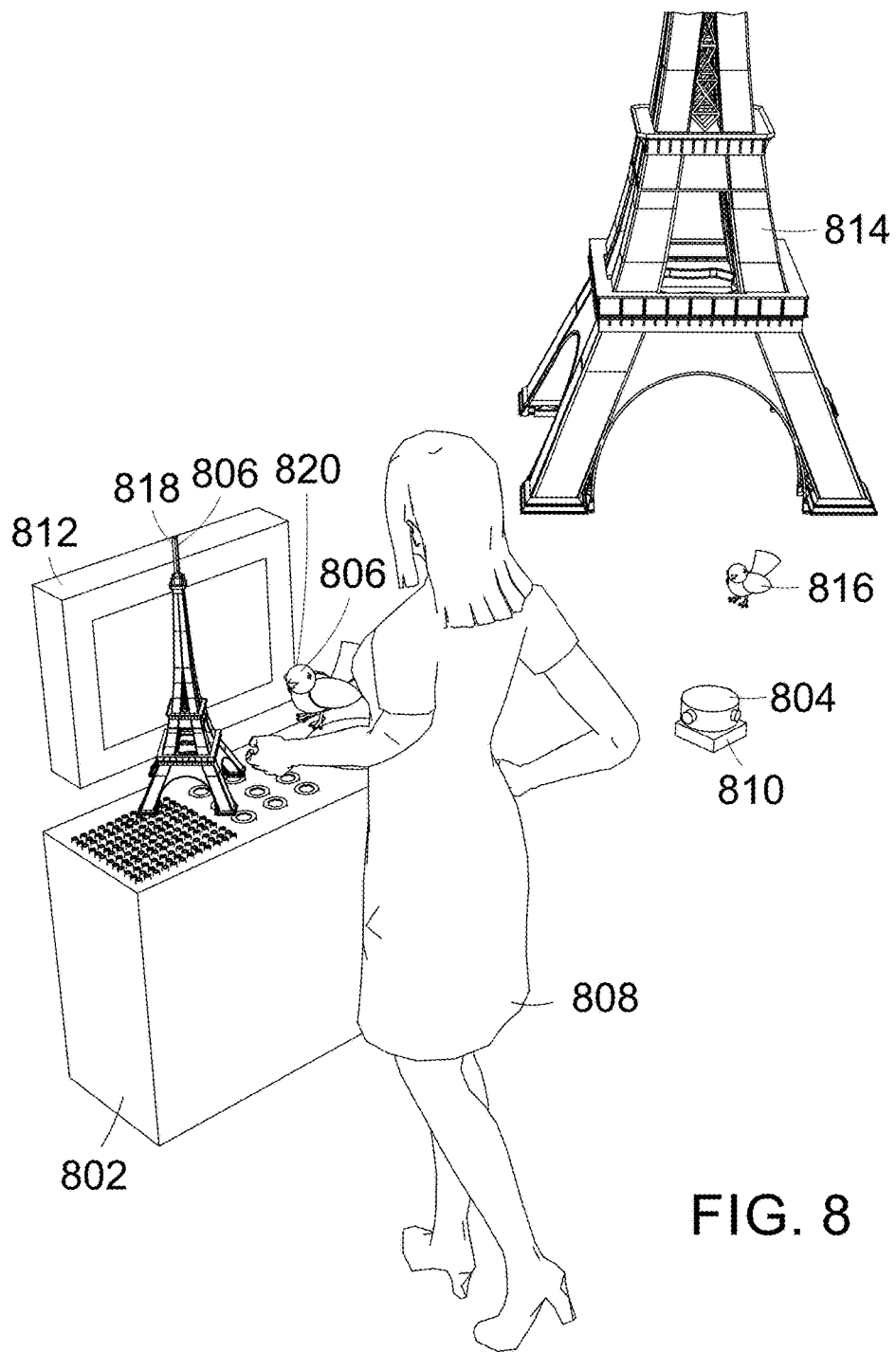
FIGS. 8 and 9 shows a perspective view of a femtosecond laser, a three dimensional cameras, a display, connected to the internet, a bird, and a structure.
Figure 9:
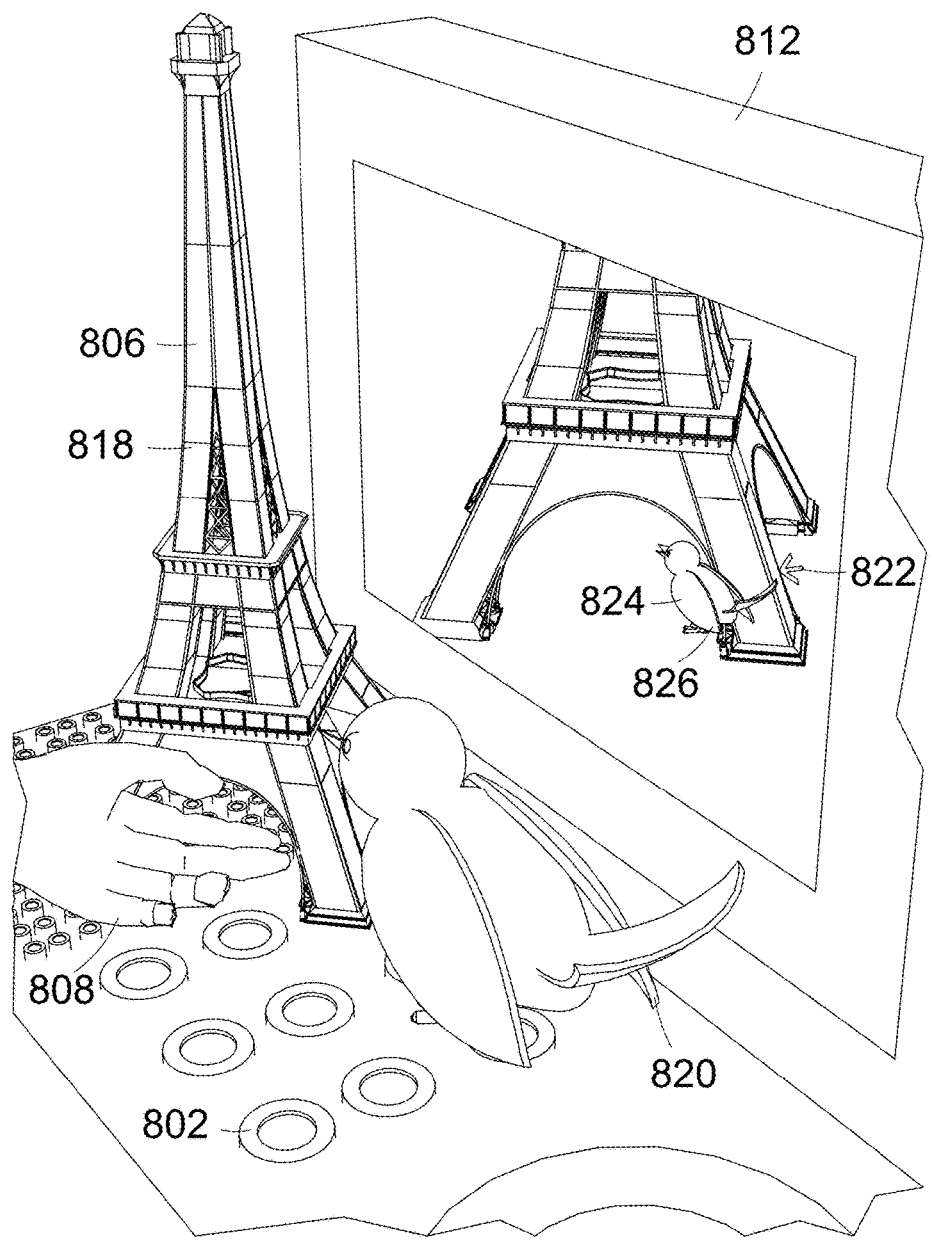

A femtosecond laser device 802, is used to create a mid-air, floating holographic object which has haptic touch 806, as illustrated in FIG. 8. The holographic object 806 is created from a view of an object or objects 814, 816, from a Project Beyond 3D camera 804 made by the Samsung company. The holographic object's shape, is the same as the view of the physical object. The information from the view of the physical object, is used to create the hologram similar, in shape to the physical object.

The Digital Nature Group use lasers, mirrors, and cameras to create three-dimensional, interactive holograms comprised of tiny points of light called voxels. The femtosecond laser device has a computer. The lasers transmit bursts that last 30 to 270 femtoseconds.

A femtosecond laser device, built by physicists from the Faculty of Physics at the University of Warsaw, Poland, can also be used to deliver laser pulses in mid-air. The laser device uses optical fiber to deliver the laser pulse. The entire laser-generating activity to occur directly within the optical fiber itself. The laser pulse is resistance to external factors when it is generated inside of the optical fiber.

The 3D camera is connected to a computer 810 at an outside location. A could also be used. Other virtual reality VR cameras could be used, such as, a VR camera made by Google, called Jump, Nokia OZO, Ricoh Theta, Kodak Pixpro SP360, 360fly, Samsung Gear 360, Nikon KeyMission, Bublcam, and a Neo 3D camera made by the Jaunt VR Company. The Project Beyond camera is used for three dimensional 3D imagining, of the camera's surroundings, as illustrated in FIG. 8.

The Project Beyond camera 804 is stereoscopic 3D and streams in real time. The Neo camera is a multiple high-resolution camera inside a unified housing. The camera is connected to a computer. The computer is connected to the internet. The laser's computer 812 is connected to the internet. The laser computer is connected to the laser device 802. A display 812 is connected to the laser computer 812.

The holograms can be projected outward from the laser at different distances, from 3 meters to 10 centimeters cm. The size of the hologram can be from 2 millimeters to 3 meters cubed.

The computer is a touch screen computer 812. The computer connects to the internet using an internet router.

Each computer connects to their own internet router. The routers connect to the internet. The second computer connects, to the femtosecond laser device's computer over the internet.

The lasers ionize air molecules in mid-air, creating the voxels. The ionized air molecules give off light. The air molecules light produces images. When the voxels are touched, they brighten. The brightening can show that the voxels are being touched.

When the voxels are touched, they create shockwaves. The mid-air haptic feel is created by shock waves that are generated by plasma when a user touches the plasma voxels. The user feels an impulse on the finger as if the light has physical substance. The mid-air feel is part of the hologram, and occupies the same space as the hologram.

Three dimensional 3D camera software is programmed into the second computer. 3D hologram creating software is programmed into the laser device computer.

The hologram creates the view sent by the camera. For example, if the view is of a car, takes up a small area of the camera's view, the hologram will be proportional to the camera's view. The more the area the car, is in the view of the camera, the larger the car hologram will be. When the view of the car fills the screen, what is shown on the screen, is created as a hologram, for example, if the view is of a part of the car's door, the view of the door is made into a hologram.

The size of the hologram door, would be limited to the size of the displayed hologram. The view of an object can be zoomed in and out, which changes the shape of the associated hologram, corresponding to the changed view.

Viewing and Touching Holograms of Objects Operation

The laser receives the view of the object. The laser creates the hologram of the object, as illustrated in FIG. 8. The user can view, and feel the haptic shape of the object.

The user can view more than one object that they want to make a hologram. The user moves a cursor on the display, to the object they want, and clicks on the object. The clicked object is chosen, to be created into a hologram.

The user can choose to make more than one object multiple holograms. The user clicks on the objects they want as holograms. The clicked objects are created into holograms.

The user can view locations on google 3D world, create, and touch holographic objects, similar to the objects at the location. Holographic objects can be created such as, rocks, trees, cars, buildings, people, water, and dogs. Users can go to inside locations, on google 3D, such as, history museums, sculpture museums, restaurants, business, and view and create and touch holographic objects, similar to the objects at the location.

For example, the user can search for and locate a 3D camera's 804 view of the Eiffel tower 814, and a bird 816, on their computer and display 812. The user 808 can move a display cursor 822, to the item they want to create as a hologram. The user clicks or selects the displayed object 824, such as, the Eiffel tower, or the bird 826 in the view, or both. The laser device 802 creates the holograms 806, 818, of the clicked images.

The user can view, and feel the shape of the hologram. The bird hologram 820 moves when the bird moves. The user can feel the movement of the bird 816. The mid-air touch can be felt three hundred and sixty degrees around the user's hand.

Objects in computer games can be felt. Objects in the virtual environment may be, other avatars, waterfalls, trees, cheese cake, space ships, hair, earth quakes, wind, spoons, lightning, sand, heat, cold, and chocolate, etc.

Alternatively, the computer could identify objects, by code in the object that tells the computer, what the object is, which the computer then creates.

For objects that don't have computer code, the computer can use object recognition to identify the object, for example, the avatar touches a table, the object recognition software identifies the object as a table, and creates a holographic table shape.

The laser array creates mid-air touch that give mid-air feel shape similar to the visual 3D, mid-air hologram object's shape. The mid-air touch can also create the mass, or weight feel of an object. The temperature of an object can be simulated. The movement of an object can be felt by the user.

Objects may be another user's hand, which can be shaken in mid-air, mid-air holograms creatures, 3D mid-air avatars from online player worlds. Objects can be locations, such as, 3D pyramids, Stonehenge, the Great Wall, Google Moon, and Google Mars.

Objects can be locations, such as, mid-air holograms of museum's collections, mid-air holograms of the Smithsonian or Louvre museums art, mid-air holograms from Google Earth, providing 3D mid-air views of travel destinations, and locations around the world.

Holograms can be 3D mid-air views of medical patient's bodies, 3D views of, and mid-air touch inside an engine, and moving holograms of people's faces, and bodies, etc.

A user can view a scene from a web cam (not shown) connected to the internet. The user's avatar can move around within the web view, and touch objects within the scene. The touched objects can be felt in mid-air touch.

A web cam can have a view, such as, a view of a street with-stores. The avatar can touch a parked car, on the web cam street view, and the user can feel the different surface feelings, of the car. The user could feel water, from a water fountain, splashing on a user's hand, in the scene. The user can touch another user's displayed face, with the avatar hand. The user can feel the users face.

The user can touch, displayed stationary and moving images, such as, as touching a metal support of an Eiffel tower, or feeling a polar bear breathing while touching their fur. The user can feel the use of a tool such as a wrench to loosen bolt. Users can touch visual 2D or 3D scenes, on the internet, such as, images in goggle street view, or google earth. Users can move around in online internet virtual 2D or 3D environments, and touch 2D or 3D objects, and touch other 2D or 3D avatars in the environment. Users can touch inside a real or virtual 2D or 3D product, such as, an espresso coffee machine.

The machine can be made large, or the avatar can be made small, and touch and move around inside the machine. Viewing and touching inside the machine, could be used for machine production quality control, or increased design information about the machine, etc.

Creating Holographic Objects from Viewed Objects on the Internet

Laser created mid-air haptic touch with the hologram can be used in medical situations, such as, feeling and viewing the of the inside of a heart. Haptic touch can be used in manufacturing and maintenance, such as, to touch and view a coffee machines water compressor.

The users hand gesture signals, what the user wants to do with their hands. For example, the user puts their thumb and finger together in a pinching motion, and grasps pinches, and the user can pull or indent the area of the hologram that is pinched. The user puts their fingers to form a flat hand, the gesture is recognized as a knife, the user can off parts or the hologram.

Laser hologram tools, can also be used to shape a hologram. The user can grasp a holographic knife, and use the knife to cut parts of the hologram. A grasping tool held by the user, can grasps and pinch the hologram, the user can pull or indent the area of the hologram that is pinched with the tool.

The object viewing camera an also be connected to the user's computer at the inside location, for viewing objects at the user's location.

The feel of the hologram can change with a change in size of the view object to create the hologram. For example, the user can touch a whole strawberry when small sized. If the strawberry is enlarged to where only a portion of the visual strawberry is created as a hologram, the user can touch the part of the strawberry that is enlarged. The feeling of the strawberry would change to that of what the enlarged strawberry would feel like.

A health care provider, can view and feel the inside of a patient's artery. The provider, can use a display of the heart on a display to create and shape the hologram the heart. The provider can also use their fingers, or psychical tools, to touch, and shape the hologram.

The holographic tool is created by the laser, and user move the tool, and view and feel the touch of the hologram tool. Using the tools, the provider can indent displayed plaque inside the artery. The provider can remove plaque, and an artery stent can be placed inside the artery. The provider can feel and view how the change to the artery, effects the feel, and view of the artery.

The user's fingers, or other body part can be used to interact with the hologram. The hand is able to touch and feel objects, move objects, zoom in and out objects, enlarging or making the object smaller.

The user can input commands on a keyboard, or mid-air hand gestures, to change the shape an object. The user activates an object shape changing mode, the object can stay stationary, and the user can use the hologram fingers or tools to contact and pull or push the object, to indent, compress, or pull, or elongate an area of the hologram.

The user can touch and feel objects, move objects, zoom in and out on objects, enlarging or making the object smaller, changing the shape of objects, cutting objects, and combining objects.

Holographic Tools

In object material removing mode, material can be added or removed by the avatar grasping a part of the object to be removed, and moving it away from the object, detaching it from the object. To change the objects shape, detached material can be added by replacing it the removed area, or in a different area.

Objects can be Combined to Change their Shapes

Objects are put in combining mode. Two or more objects can be place together, touching each other. The objects are fussed, joined together, where they touched, when the combing mode is exited. An object cutting tool can be used to cut, and separate an area of the visual image of the object.

Holographic Sculptures and objects can be created by changing the shape of a pliable object by changing the shape of an object in mid-air with the user's hand. Environments can be created where user created objects are displayed, and are touchable by other users.

Three dimensional cameras can be used to view, and to create 3D models of locations, such as, rooms, people, a bird, and objects, etc. Three dimensional 3D cameras, such as, a Matterhorn 3D camera, a Panasonic 3D camcorder, and an Aiptek 3D camcorder, etc. The Matterhorn camera maps 3D spaces of rooms, which avatars can move in, view, and interact in the room.

Feel of Objects

Another way to create haptic touch from 2D or 3D, mid-air holograms viewed object is for the computer to use try to identify the surface textures of and object, and create those textures in midair.

There are different ways the computer can generate the feel of an object. Images can have computer code in the picture that is activated when the avatar touches the object, the activated object signals the lasers to generate haptic touch that allows users to feel the objet with mid-air haptic touch.

Another way is the computer interprets the different lighting and shading of a picture as differing mid-air touch. The differing mid-air touch is similar to the features of the object. Another way is the computer interprets differing 3D image's information into differing haptic touch.

Another way is the computer interprets a pictures light textures as haptic touch. Another way is assigning and associating differing mid-air feeling to differing objects. The differing objects have the preprogrammed feeling can be embedded in touchable objects, for example, an avatar touching water will create a mid-air touch water feeling on the user's hand, when touching the hologram.

A variety of ways can be used to create the surface and movement feel, of two 2D or three dimensional 3D objects. The viewed 2D or 3D objects may have preprogrammed touch information that can be sent to the user's computer, from the computer creating the view of the displayed object. The user's computer can generate midair touch from the received preprogrammed object data. For example, preprogrammed information may include, what the object should feel like, such as, the computer identifying a displayed car in the 2D or 3D, mid-air holograms view.

The web site or user, can preprogram how a car feels, and the car's various objects feel. When the user's avatar touches a part of the car the computer has the laser generate the hologram, and mid-air feel of the object.

Mid-air touch can be used by health care providers, such as, aiding medical patients. The health care providers can touch the 3D visualizations of the inside of a patient's body, such as, the patient's heart, brain, spleen, etc.

3D Printing of an Object

A 3D printer can be connected the computer. The user can instruct the computer to instruct the 3D printer to print the 3D shape of the object. The printer prints the 3D shape of the object, from received computer instructions. A 2D printer can be connected the computer. The user can print the 2D visual view of the object.

The display means is the display, the mid-air touch shape creating means is the hologram, and mid-air haptic touch laser, the finger gesture recognition means is the mid-air finger gesture recognition camera, and the 3D printer means is the 3D printer.

Multiple Lasers and a Big Laser's Used to Create Larger Holographic Objects Description A wall of lasers, and a big laser both create the same holograms. The different lasers configurations are two different ways of creating the same holograms.

Five or more hologram laser devices are position vertically. The lasers can be arranged in different configurations to each other, such as, a wall of lasers can be created, by 12 lasers with 3 lasers in one horizontal row, and 4 of the rows vertically on top of each other. One big laser is connected to the hologram computer.

An outside 3D camera's computer is connected to the internet. An inside computer is connected to the internet. The outside and inside computer communicate with each other, over the internet. The inside computer is connected to the laser devices. A display is connected to the inside computer.

A 3D camera is connected to the inside computer. A mouse, and a touch input screen is connected to the computer.

Each computer connects to their own internet router. The routers connect to the internet. The second computer connects to the femtosecond laser device's computer over the internet. A display connects to the laser device's computer.

Multiple Lasers and a Big Laser's Used to Create Larger Holographic Objects Operation The user can choose to make more than one hologram object, or multiple hologram objects. The user clicks on the objects they want as holograms. The clicked objects are highlighted. The clicked objects are created into holograms.

The user can use the hologram like a touch display. The view can be moved up, down, left right, zoomed in, and zoomed out, by the user's hand gestures in mid-air. The hand gestures are with in view of the camera.

The display can also change the viewed hologram. The hologram can be the same view as being shown on the display. If 2D and or 3D views are being shown on the display, the hologram will replicate the 2D and 3D display views.

The user can move the view using, a mouse input, a touch screen input, or mid-air hand gesture input. The one big laser can be used to create a human sized hologram. The computer creates the 3d shape as the hologram view moves the holograms changes.

The user can have a performer's performance viewed and sent over the internet to the user's computer. The laser device can create a hologram of the user's movements in real time. The audio of the performer can be heard being broadcast by the speaker. With 2D views the computer can use object recognition to identify objects, the identified objects can be outlined, showing the available objects to be clicked on.

Different lasers light frequencies produce different color, holograms, such as, blue, yellow, red, green, orange, and white holograms, etc. Their different hologram color lasers light is combined to produces colors that are the real colors of the objects viewed.

The surface feel of the hologram, can be similar to the objects surface. The hologram produces the objects feel, such as, a smooth feel, a rough feel, etc. The object consistency of the object can be felt, such as, a hard feel, a soft feel.

The objects temperature can be felt, such as, a warm feel, a cool feel, and room temperature feel, etc. The objects movement can be felt, such as, a spinning feel, a vibrating feel, an up, down, sideways, extending, or retracting movement feel, a flowing feel, etc.

Users Touching and Inputting into Objects at Distant Locations Description

Figure 7:
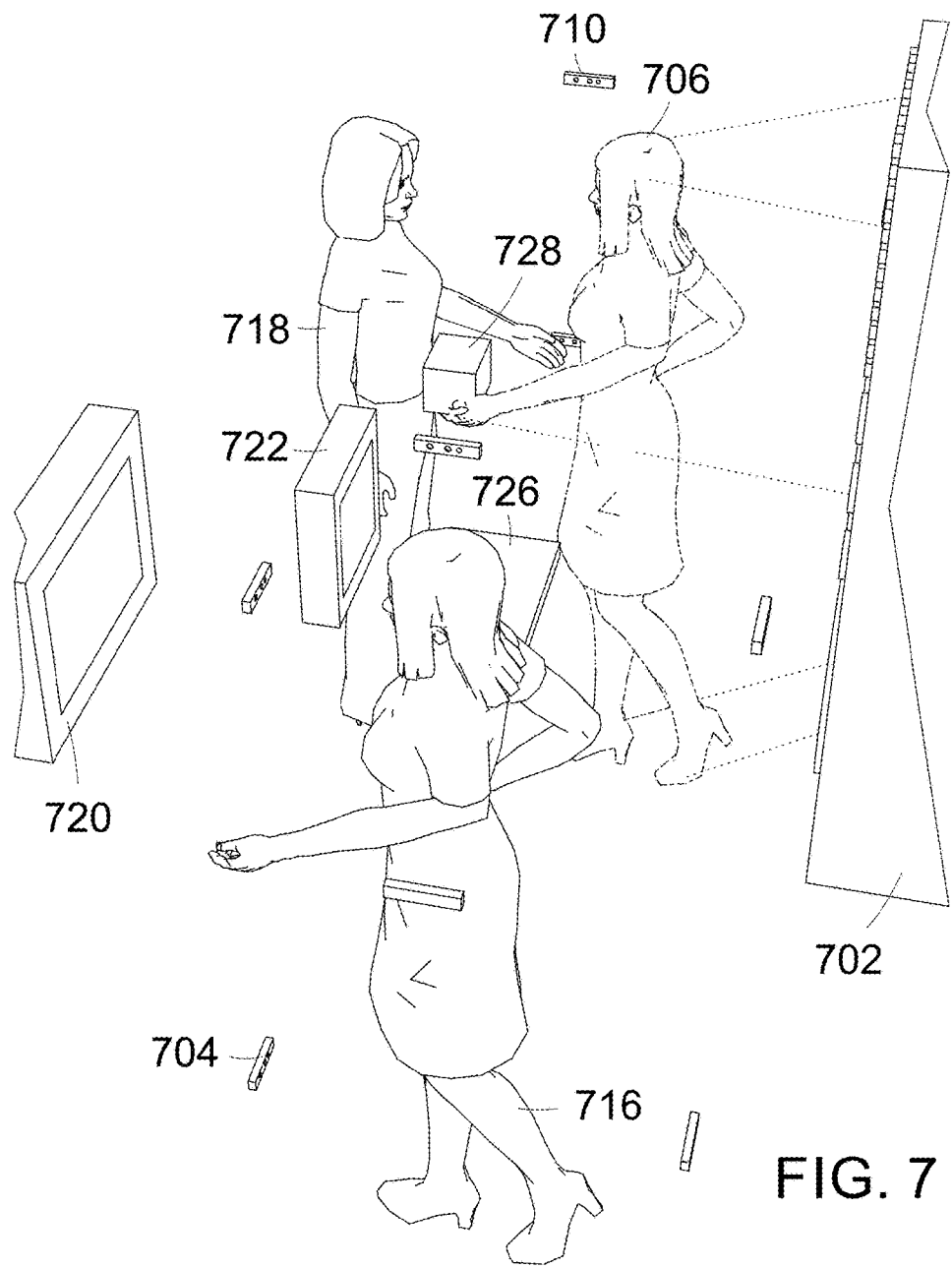
FIG. 7 shows a perspective view of a femtosecond laser, three dimensional cameras, and two displays, connected to the internet

A wall of lasers 702, combine their holograms to create a big hologram, as illustrated in FIG. 7. A first group of Kinect cameras 704, are positioned to view a first user 716. The Kinect cameras, and display, are connected to a first computer 720. The cameras could also be realsense cameras. The first computer is connected to the internet. A microphone and speaker are connected to the computer.

The first computer connects to a second computer 722, over the internet. The second computer connects to a group of femtosecond lasers device 702 which are position vertically, to create a user sized hologram 706.

A second group of cameras 710, are positioned to view the user's hologram 706, a second microphone, and a second speaker, connect to the second computer. A touch screen computer 722, a keyboard 726, a paper box 728, and another second user 718 are within touching distance of the user's hologram.

Users Touching and Inputting into Objects at Distant Locations Operation

The first user 716 views the second location, and their holograms 706 movements on the computer display 720, as illustrated in FIG. 7. The movements of the user and their hologram are synchronized. If the user 716 moves, the hologram 706 moves the same way as the user 716. The user uses the view of their hologram to move their hologram.

The hologram is operated by the first user 716, and can touch other users 718, who are within touching distance of the hologram. The other user can feel the touch of the hologram on their body. The hologram and the hologram's operator, can talk to, and listen to other users. The hologram can give a back rub.

The user can operate the hologram to pick up and hold things like a piece of paper. The hologram can be positioned at different locations, such as, a coffee shop. The hologram can type on touch screen display, on a mid-air touch display, on a regular keyboard, people can have their holograms go to work for them, and operate their holograms from their apartment. The use can direct their hologram to go a casino betting table, such as, a black jack table, and their hologram can type on touch screen display.

The display 720, and hologram allow users, to have simultaneous visual displayed interaction with each other. The first user views the other user 718 on the display 720, and the other user views the first user's hologram 706.

The users can transmit vocal communication with each other, by using the microphones. The users can receive audio communication from each other, by using the speakers. The user can receive sound associated with computer generated objects, and avatars from the speaker.

The user can go to individual different laser devices, using the internet, at located different locations, and interact with the users at the locations.

An example of the user's hologram interacting with people at a location could be, the user can virtually travel to a casino and place bets on a dice betting table. The table can be set to accommodate holographic reality players. The table can be a screen that shows where a virtual reality payer places their bets, or someone could place the bets for them. The virtual reality traveler's face, and or body and face can be holographic ally projected, which users at the table can view.

A dice throwing machine could be at the table, and connected to the internet, to allow the holographic user to control the machine. The holographic user could throw dice using the machine. The dice machine can be controlled, by the hand movements of the virtual reality user, and touch of the hologram. The holographic user's presence and actions at the table are the same as people at the table, except the holographic user's body isn't physically present.

The hologram can be automated. The second computer can be programmed with visual user facial recognition software. The holograms can do customer service computerized hotel check in, mobile holograms can shake people's hands. The holograms can converse with users, by using Apples Siri, or Microsoft's Cortana, which gives replies to verbal questions. Verbal conversational software is programmed in to the computer, to allow the holograms to converse with users.

Users can shake each other holographic hands. The user's view and feel the other user's hand in mid-air. The hand is connected to the user's holographic displayed body.

Users Touching Each Other by Touching Each Other's Holograms Description

Figure 5:
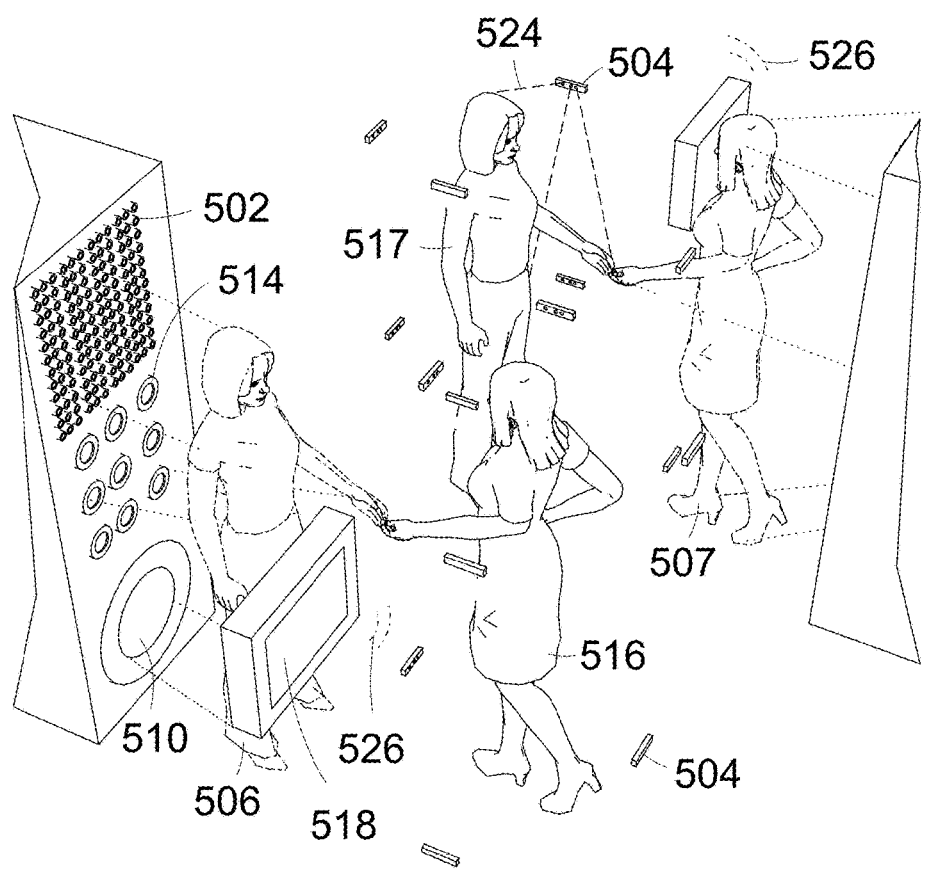
FIGS. 5 and 6 shows a perspective view of two femtosecond laser devices, gesture recognition cameras, and displays, connected to the internet.
Figure 6:
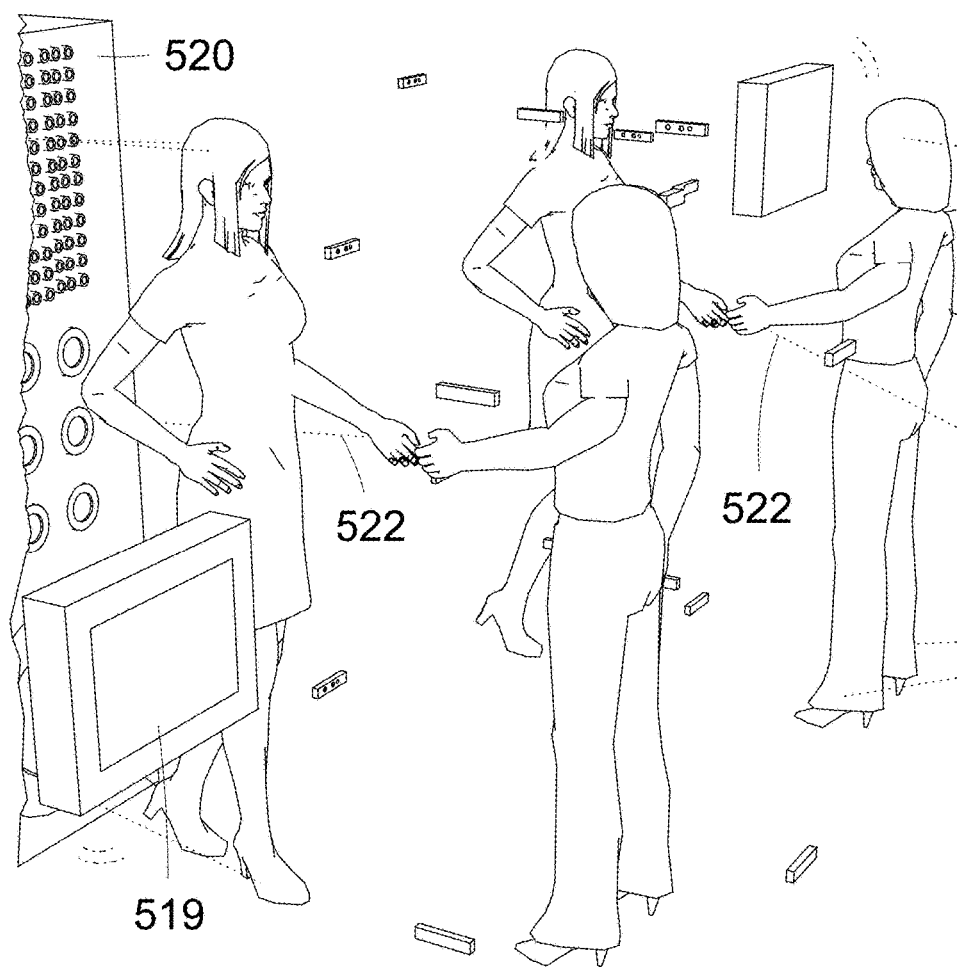

User's 516 can simultaneously touch each other by touching each other's holograms 506, as illustrated in FIGS. 5 and 6. Users can communicate with holograms while they are in different location, by sending data of themselves over the internet, and having the data received by a computer. The holograms have mid-air haptic touch.

A first group of lasers and computer, is located at a first location. A hundred and forty-four 144 small femtosecond lasers 502, nine 9 medium 514 femtosecond lasers, one big small femtosecond laser 510, is positioned to project a standing user. More lasers can be used to increase the definition of the holograms. In FIGS. 5 and 6, the lasers are positioned to each project laser beams 522, to create the hologram 506, 507.

The lasers are connected to a first user's 506 computer 518. The lasers can be arranged in different configurations to each other, such as, a wall of lasers can be created, by 12 lasers with 3 lasers in one horizontal row, and 4 of the rows vertically on top of each other. One big laser is connected to the first computer. A first group of realsense cameras 504, and display 518, are connected to the first computer 518.

The first computer is connected, to an internet router by WIFI 526, the router connects to the internet. A first group of realsense cameras 504, are positioned to view the first user.

A second group of lasers 520 having the same configuration as the first group of lasers, cameras, and computer in a similar configuration as the first group, are located at a second location. The second group is configured to view a second user 517. The first 518 and second computer 519 are connected to each other over the internet.

The cameras are placed on camera holders (not shown). The computers are placed on computer holders (not shown). Each computer has a microphone, and speaker.

Users Touching Each Other by Touching Each Other's Holograms Operation

User can touch just a part of and other user's body, as illustrated in FIGS. 5 and 6. People can simultaneously touch each other's holograms. A first 516 and second user 517, have their body viewed by the 3D cameras. The camera views 524 of the user are stitched together, by the computer and software, to create the 3D view of the user.

Users have a view of each user's body, which is being sent to the other user's laser device. The view sent of the user's body, is used to create the hologram of their body, by the receiving laser device. Each user is within touching distance of one of the laser device's holograms 506, 507. The first user 516 can touch the second user's hologram 507 of their body. The second user 517 can touch the first user's hologram 506 of their body. Each hologram moves in real time. The users can feel the other user's holographic touch. More than two users can create holograms, and touch each other's holograms.

Users can engage in simultaneously holographic sexual activity with each other. The user's genitals can be stimulated by the touch of the other user's hologram. The lasers can be located near the user's genital's, to mid-air touch stimulate the genitals, by producing feelings similar to sexual stimulation, or other unique feelings made possible by the mid-air touch shapes.

Users can touch a multiple of other users in real time by creating two or more user holograms. Two user holograms are created by two laser devices, each laser device creating one of the unique users. One Laser device could also create two different holographic users.

Users can talk to and hear each other using the computers microphone, and speakers. Users can grab, throw and catch an object back and forth between each other, such as, a ball, or a Frisbee, etc.

Medical providers can operate robotic surgery machines, over the internet, performing surgery on a patient. The surgery provider can mid-air touch feel the operation of the robotic hand input devices, and feel the physical input device's inter action with the patient's body. The provider can also hold and operate mid-air touch tools, and feel the tools contact with the patient's body.

Users can play online computer games, such as, online internet role playing games. Users can view, touch and feel touch objects, and avatars in the game.

Users and people at the location can interact with each other. People at the location can view virtual reality users, or the user's avatar on a display, or holographic projection. Users can view the people, using cameras at the location, etc. People and the user can touch each other, using connected arrays. Users talk to each other using microphones, and speakers. Users avatars at cafes, can order virtual coffee and food, which can be sold by the café.

Virtual tables can be set up for virtual users to sit at. Mid-air touch holograms can provide a surgeon with information, which are otherwise hidden, such as showing the heartbeat rate, the blood pressure, the state of the patient's organs, and feel of the patient.

Real time 2D, or 3D cameras 424 and displays can be used at locations in the world, and view real world objects and people. The cameras allow to people at the location, and virtual reality users on the internet to congregate and communicate with each other. Locations where people, and virtual reality users on the internet, can go to, and meet each other, talk to each other, and can touch each other. Virtual reality users can meet other people on the internet, and go to a café and have a coffee anywhere in the world, and communicate with people at the location they go to. The user can have an avatar located at a location that is viewable, by other users. The user can view the other user's avatars.

The users and their avatars can communicate with each other, visually, audibly, and tactilely, using touch. The users can communicate with people at locations, with displays, microphones, and speakers, at the locations.

Locations where people, congregate may include, cafes, bars, taverns, restaurants, outdoor café, beaches, music concert halls, sports events, libraries, lectures, and class rooms, etc. Cameras can be placed that allow people on the internet using holograms, and displays, to communicate with people, at different locations.

Conclusions, Ramifications, and Scope

From the preceding description and drawings it becomes apparent that the user, may use holograms to operate a device sanitarily.

The femtosecond laser device, allows a user, to input holograms in mid-air. The mid-air input can be used to direct the operation of a device, such as, an elevator. The user can input without the need to contact a physical surface. Avoiding contact with an input surface, decrease the chance of touching bacteria on the surface of the input surface. Avoiding bacteria increases the ability to remain bacterially free, from bacteria which may have a negative impact on the user's body.

A user can view and touch the shape of a hologram. The hologram can be created from a picture, or a camera's view of an object, such as, a tree. The camera can be at a distant location, and send the view of the tree, over the internet, to the computer, used to create the hologram.

Two laser devices can be connected to each other, over the internet, to allow a user, at each laser, to send a hologram of themselves to the other user. The user can view, touch, and speak to the other user's hologram.

Thus the reader will see that at least one embodiment, of the user hologram display connected to a device, provides a more reliable, fun, healthier and economical display, that can be used by persons of almost any age.

It will be apparent that various changes, and modifications can be made, without departing from the scope of the various embodiments, as defined in the claims. Thus the scope of the embodiments, should be determined by the appended claims, and their equivalents, rather than by the examples given.

The invention claimed is:

1. Buttons for a device, the buttons displayed in midair, the buttons being a plurality of input buttons, comprising,
   the device being an elevator,
   the elevator having a plurality of operations,
   the buttons are positioned in the elevator,
   the buttons are positioned to be viewable,
   the buttons are positioned to be able to be contacted by a user's finger when the user is in the elevator,
   the buttons are holograms,
   the holograms generate light,
   the light is made by a plasma created with air molecules,
   the plasma is made by a laser beam,
   the laser beam is made by a laser,
   the plasma creates a feel,
   the user's finger detects the feel when in contact with the plasma,
   a sensor is connected to a computer,
   the sensor is configured to detect the finger's contact with one of the buttons,
   the detection of contact of the finger with one of the buttons is associated to activating the button being contacted,
   the activation of one of the buttons is associated to an activation of one of the operations,
   each button visually describes the activated operation that the activation of button is associated to.

2. The buttons of claim 1, further including a plurality of lasers,
   each laser producing a laser beam,
   each laser beam creating one hologram in midair,
   each hologram is inside the elevator,
   each hologram is positioned to be viewable,
   each hologram is positioned to be contactable by the user,
   and each hologram is one of the plurality of buttons.

3. The buttons of claim 1, wherein the sensor is a camera, and the holograms are volumetric three-dimensional displays.

4. The buttons of claim 1, wherein the laser is a femtosecond laser.

5. The buttons of claim 1, wherein the laser is connected to the computer.

6. The buttons of claim 1, wherein one of the buttons is a number 1 floor button,
   one of the elevator's operations is movement of the elevator to a 1 floor,
   and the activation of the 1 floor button is associated to the activation of the elevator's operation of movement of the elevator to the 1 floor.

7. The buttons of claim 1, wherein one of the buttons is a number 4 floor button,
   one of the elevator's operations is movement of the elevator to a 4 floor,
   and the activation of the 4-floor button is associated to the activation of the elevator's operation of movement of the elevator to the 4 floor.

8. The buttons of claim 1, further including the activation of the button is associated to a speaker producing a sound,
   the speaker is connected to the computer,
   and the user can avoid contact with possible harmful bacteria that could be on possible plastic buttons of the elevator, by contacting the buttons which are free of bacteria in midair.

9. The buttons of claim 1, further including the activated button changing to a different design.

10. The buttons of claim 1, further including the activated button changing to a different color.

11. A method for operating a device by a user touching buttons in midair, the buttons being a plurality of input buttons comprising,
    providing an elevator as the device, and the elevator having a plurality of operations,
    displaying the buttons inside the elevator,
      with a laser making a laser beam,
      the laser beam inside the elevator,
      the laser beam exciting air molecules in midair,
      the excited air molecules producing a light,
      the light being visible by the user,
      the buttons being the light,
    producing a feel with the buttons,
      by the excited air molecules producing a feel,
      the user's finger detecting the feel when touching the buttons,
      the buttons positioned to be touchable by the user's finger when the user is inside the elevator,
    detecting the user's touch of one of the buttons,
      with a sensor configured to detect the touch of the user's finger with one of the buttons,
      the sensor connected to a computer,
    associating the detection of the touch of the finger with one of the buttons with an activation of the button being touched,
    associating the activation of one of the buttons to an activation of one of the operations,
    with the computer,
    displaying each button's activated associated activated operation,
      with each button displaying the operation that each button is associated to activating,
    activating the button detected being touched,
    activating the operation associated to the activation of the of activated button.

12. The method of claim 11, further including a plurality of lasers,
  each laser producing a laser beam,
  each laser beam is inside the elevator,
  each laser beam exciting air molecules in midair,
  each excited air molecules making one of the buttons,
  each button positioned to be viewable,
  and each button positioned to be touchable by the user.

13. The method of claim 11, wherein the laser is a femtosecond laser.

14. The method of claim 11, wherein the laser is connected to the computer.

15. The method of claim 11, wherein one of the buttons is a number 1 floor button,
  one of the elevator's operations is movement of the elevator to a 1 floor,
  and the activation of the 1 floor button is associated to the activation of the elevator's operation of movement of the elevator to the 1 floor.

16. The method of claim 11, wherein one of the buttons is a number 4 floor button,
  one of the elevator's operations is movement of the elevator to a 4 floor,
  and the activation of the 4-floor button is associated to the activation of the elevator's operation of movement of the elevator to the 4 floor.

17. The method of claim 11, wherein one of the buttons is a door close button.

18. The method of claim 11, further providing the activated button changing to a design which is different from the button's present design.

19. The method of claim 11, further providing the activated button changing to a color which is different from the button's present color,
  the excited air molecules producing a sound,
  and the user's finger illuminating when in contact with the button.

20. The method of claim 11, wherein the sensor is a camera.

* * * * *